US012218840B2

(12) United States Patent
Deval et al.

(10) Patent No.: US 12,218,840 B2
(45) Date of Patent: Feb. 4, 2025

(54) FLEXIBLE SCHEME FOR ADDING RULES TO A NIC PIPELINE

(71) Applicant: Intel Corporation, Santa Clara, CA (US)

(72) Inventors: Manasi Deval, Portland, OR (US); Elazar Cohen, Haifa (IL); Shaul Yifrach, Haifa (IL); Parthasarathy Sarangam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1084 days.

(21) Appl. No.: 16/902,371

(22) Filed: Jun. 16, 2020

(65) Prior Publication Data

US 2020/0314011 A1 Oct. 1, 2020

(51) Int. Cl.
*H04L 45/7453* (2022.01)
*H04L 45/00* (2022.01)
*H04L 45/745* (2022.01)
*H04L 69/22* (2022.01)

(52) U.S. Cl.
CPC .......... *H04L 45/7453* (2013.01); *H04L 45/38* (2013.01); *H04L 45/54* (2013.01); *H04L 45/74591* (2022.05); *H04L 69/22* (2013.01)

(58) Field of Classification Search
CPC ......... H04L 45/74; H04L 45/54; H04L 45/38; H04L 69/22
See application file for complete search history.

(56) References Cited

U.S. PATENT DOCUMENTS

| 10,594,630 | B1 * | 3/2020 | Bosshart | H04L 45/745 |
| 10,834,241 | B1 * | 11/2020 | McBryan | H04L 69/22 |
| 11,018,978 | B1 * | 5/2021 | Grinberg | G06F 1/3243 |
| 11,425,036 | B1 * | 8/2022 | Herrera | H04L 45/24 |
| 12,095,882 | B2 * | 9/2024 | Daly | H04L 49/70 |

(Continued)

OTHER PUBLICATIONS

Bosshart et al, "P4: Programming Protocol-Independent Packet Processors", ACM SIGCOMM Computer Communication Review, vol. 44, No. 3, Jul. 2014, 8 pages.

(Continued)

*Primary Examiner* — Xavier S Wong
(74) *Attorney, Agent, or Firm* — Compass IP Law PC

(57) ABSTRACT

Flexible schemes for adding rules to a NIC pipeline and associated apparatus. Multiple match-action tables are implemented in host memory of a platform defining actions to be taken for matching packet flows. A packet processing pipeline and an exact match (EM) cache is implemented on a network interface, such as a NIC, installed in the platform. A portion of the match-action entries in the host memory match-action tables are cached in the EM cache. Received packets are processed to generate a key that is used as a lookup for the EM cache. If a match is found, the action is taken. For a miss, the key is forwarded to the host software and the match-action tables are searched. For a match, the action is taken, and the entry is added to the EM cache. If no match is found, a new match-action entry is added to a match-action table. Aging-out mechanisms are used for the match-action tables and the EM cache. A multi-hash scheme is used to that supports a very large number of match-action entries.

20 Claims, 17 Drawing Sheets

(56) References Cited

U.S. PATENT DOCUMENTS

| | | | | |
|---|---|---|---|---|
| 2002/0143787 A1* | 10/2002 | Knee | ............. | H04L 45/54 |
| | | | | 707/999.102 |
| 2015/0281125 A1* | 10/2015 | Koponen | ............ | H04L 47/2441 |
| | | | | 711/122 |
| 2016/0191384 A1* | 6/2016 | Shelar | ............. | H04L 45/38 |
| | | | | 370/392 |
| 2017/0091258 A1* | 3/2017 | Rajahalme | ............. | H04L 45/54 |
| 2019/0012156 A1* | 1/2019 | Daly | ............. | G06F 8/51 |
| 2019/0379606 A1* | 12/2019 | Tu | ............. | H04L 45/7453 |

OTHER PUBLICATIONS

Kaufmann et al, "High Performance Packet Processing with FlexNIC", ASPLOS '16, Apr. 2-6, 2016, Atlanta, GA USA, 15 pages.

Liu et al, "DistCache: Provable Load Balancing for Large-Scale Storage Systems with Distributed Caching", Proceedings of the 17th USENIX Conference on File and Storage Technologies (FAST '19), Feb. 25-28, 2019, Boston, MA, USA, 16 pages.

Sharma et al, "Evaluating the Power of Flexible Packet Processing for Network Resource Allocation", Proceedings of the 14th USENIX Symposium on Networked Systems Design and Implementation (NSDI '17), Mar. 27-29, 2017, Boston, MA USA, 17 pages.

* cited by examiner

| Counting type | Timer resolution | Count down value | Status | Etc... | |
|---|---|---|---|---|---|
| 0 – Free running<br><br>1 – Auto refreshing | 0 – mSec<br><br>1 – uSec<br><br>2 - nSec | Any number (say 8) counting down at each tick defined at the above resolution | 0 – Aged out<br><br>1 – Active<br><br>2 – FIN/RST | | |
| 802 | 804 | 806 | 808 | 810 | |

FLEXIBLE SCHEME FOR ADDING RULES TO A NIC PIPELINE

BACKGROUND INFORMATION

Historically, packet-processing of network traffic for Layer 3 and above was performed using an operating system (OS) network stack. For example, following PHY (Physical) Layer 1 and MAC (Media Access Channel) Layer 2 processing by a network interface device, such as a network adapter or network interface controller (NIC), an extracted Ethernet packet would be buffered in system memory and packet processing of the packet would be performed by OS network stack components. These operations included packet/flow classification using various techniques, such as n-tuple classification based on n fields in a packet's Layer 3 or above header, TCP operations, etc.

As network speeds (bandwidth) and network utilization increased, software-based packet processing had difficulty in supporting line-wire packet rates and began consuming ever-greater CPU loads. This led to the introduction of the first generation of "smart" NICs (aka SmartNIC) which were configured to offload some of the Layer 3 and Layer 4 processing. Subsequently, more advanced smart NICs have been developed that are configured to handle high-bandwidth traffic and support extended functionality beyond the basic network stack.

The current generation of smart NICs has evolved from supporting stateless offloads to offloading the capabilities of the software virtual switches (vSwitches). As a result, the NIC hardware supports several match-action tables that are matched in series or parallel to achieve the processing outcome of the vSwitch as a hardware offload. Each table generally needs a large number of entries and the mode of adding entries to hardware should be atomic, maintain memory coherency and be fast. Current NIC models use a firmware write that is quite slow. Some models use a programming packet that is inflexible and comes at the cost of PCIe (Peripheral Component Interconnect Express) bandwidth, resulting in head of line blocking and increasing jitter.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 8 is a diagram illustrating the format of an aging data structure, according to one embodiment;

DETAILED DESCRIPTION

Figure 1:
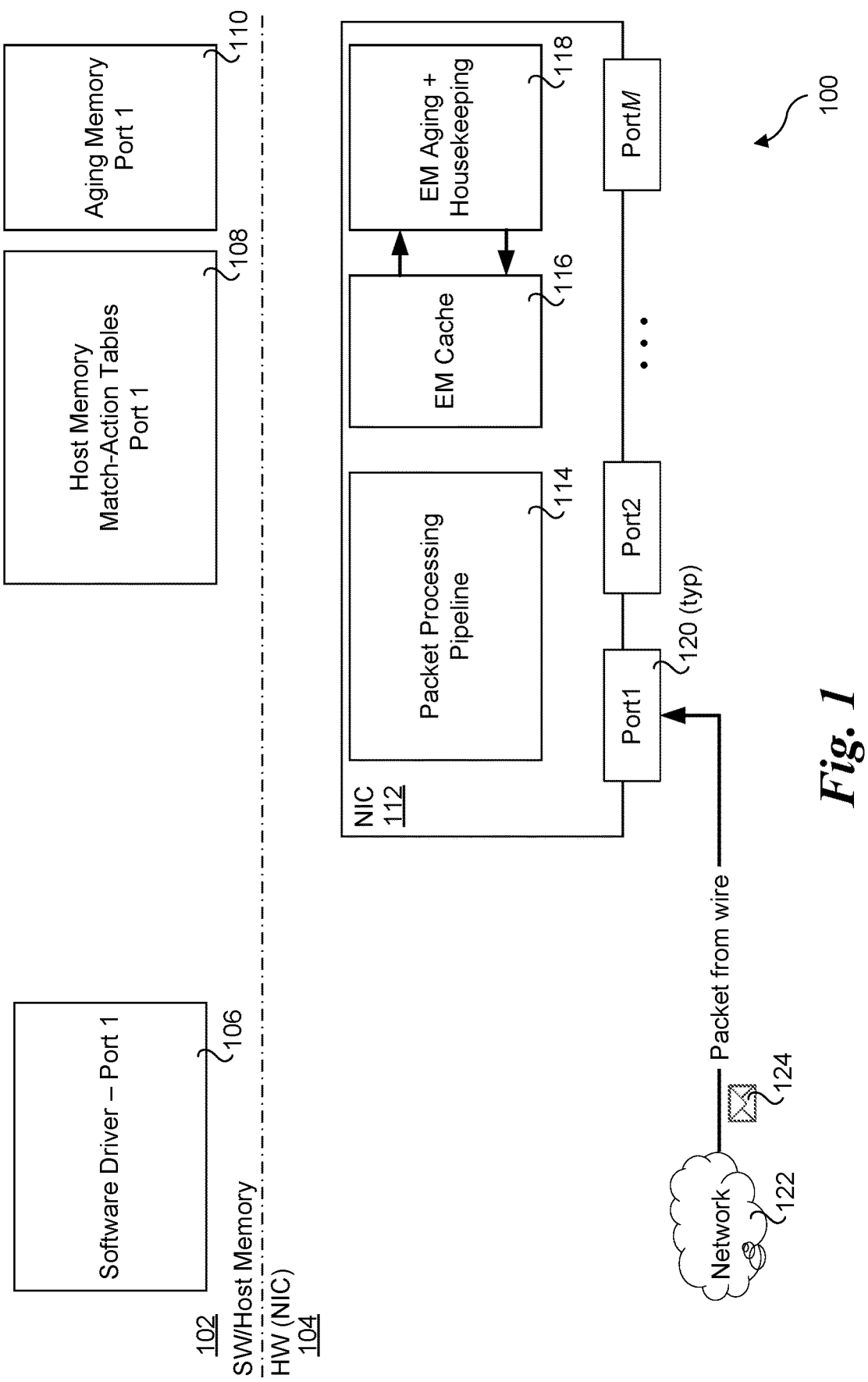
FIG. 1 is a schematic diagram of a platform architecture in which aspects of the embodiments herein may be implemented.

Embodiments of flexible schemes for adding rules to a NIC pipeline and associated apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, a vSwitch offloading solution is described that provides an atomic and flexible method of adding flow entries to hardware. The solution supports use of a very large number of match-action entries (also called flow entries) that define actions to be taken by the hardware (e.g., NIC) for associated packet flows. This mode of addition of flow entries allows the choice of rule addition to be in software such that the software may test out many different schemes for the implementation of rule caching.

vSwitch packet processing has two optimization points with regards to construction and management of exact match tables. One is to have the whole lookup flow done in software, which provides maximum flexibility for a variety of solutions and future requirements. The second is to fully offload the lookup to hardware. Performing the lookup flow in software consumes much or all of a platform's CPU resources, requires high-performance CPUs, and reduces the availability of the CPUs for performing other workloads. Currently, hardware-based offloading implies a hardened and expensive solution, which is limited with regards to its flexibility and forward-looking compatibility.

The innovations described herein focus on leveraging the full flexibility required in the construction, destruction, and management that software can provide, with an efficient hardware offload scheme employing a multi-hash lookup. The ability to share the exact mapping of elements into a hash-based lookup table, between hardware and software, assures atomicity and perfect coordination between them. The innovations also provide a means for finding the right balance of hardware/software role and ownership over the processing tasks, such that the benefit of both is maximized. The benefit is not only the performance per cost of that solution, but also its scalability and future looking value.

FIG. 1 shows an embodiment of a platform architecture 100 including a software (SW)/host memory layer 102 and a hardware (HW)/NIC layer 104. Software components and various data structures are implemented in SW/host memory layer 102 including a software driver 106, host memory match-action tables 108, and host memory aging+housekeeping block 110. HW/NIC layer 104 includes a NIC 112 having a packet processing pipeline 114, an Exact Match (EM) Cache 116, and a EM aging+housekeeping block 118. NIC 112 includes M ports 120 labeled Port 1, Port 2 . . . PortM, where M is one or more. An instance of each of software driver 106, host memory action match tables 108, and aging memory 110 will be implemented for each port 120, as illustrated by "Port 1" in FIG. 1 (only a single instance is shown in the Figures herein).

One or more of Port 1, Port 2 . . . PortM may be connected to a network, as depicted by Port 1 being connected to a network 122. A packet 124 is depicted as being received from network 122, which is referred to as "packet from wire." Generally, Port 1, Port 2 . . . PortM may be connected to the same network or two or more different networks.

Creation of New Match-Action Entry in Host Memory

Figure 1A:
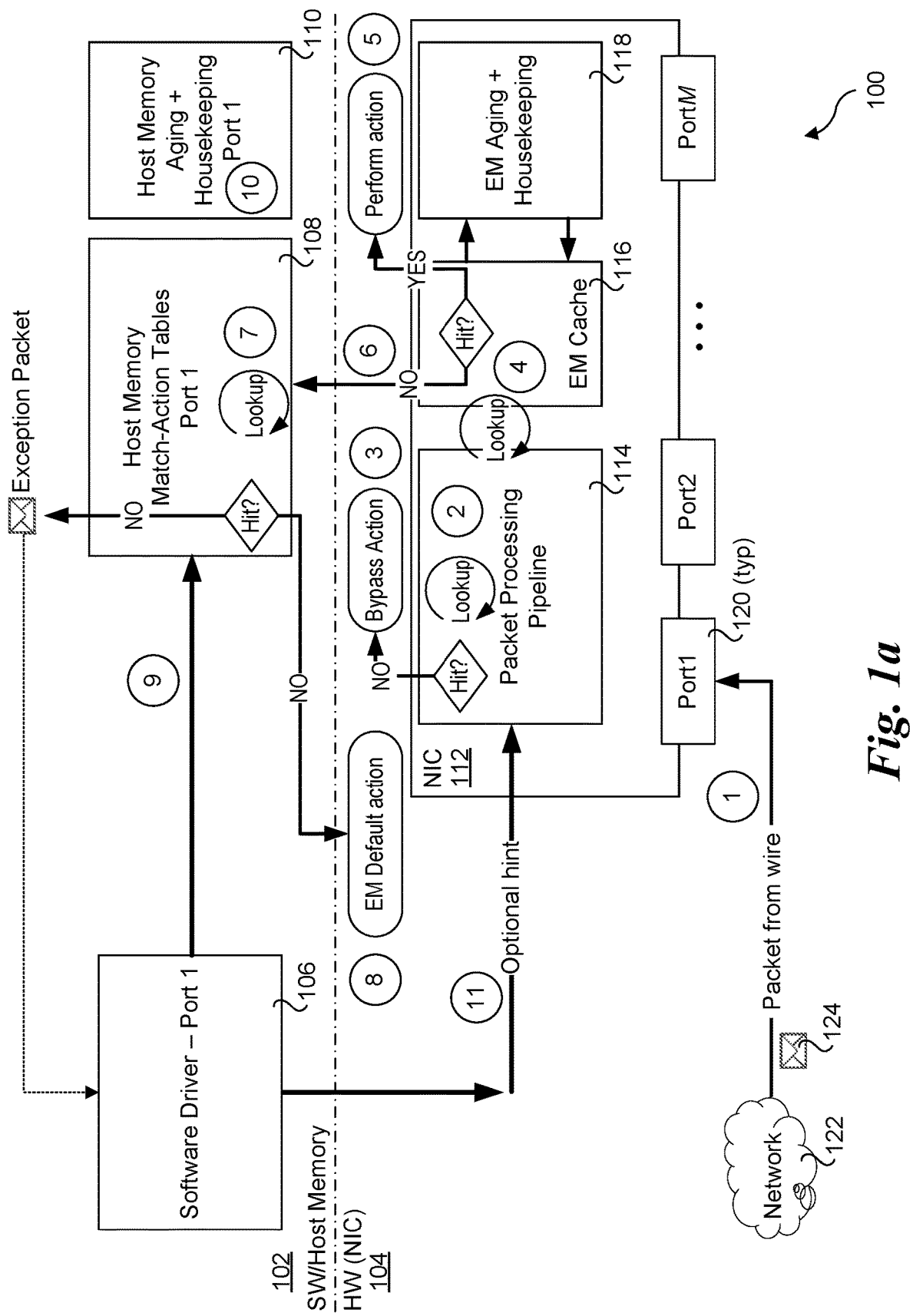
FIG. 1a illustrates processing and handling of a packet using the platform architecture of FIG. 1 under which there are no matches in an EM cache and host memory match action tables, resulting in an exception.
Figure 2A:
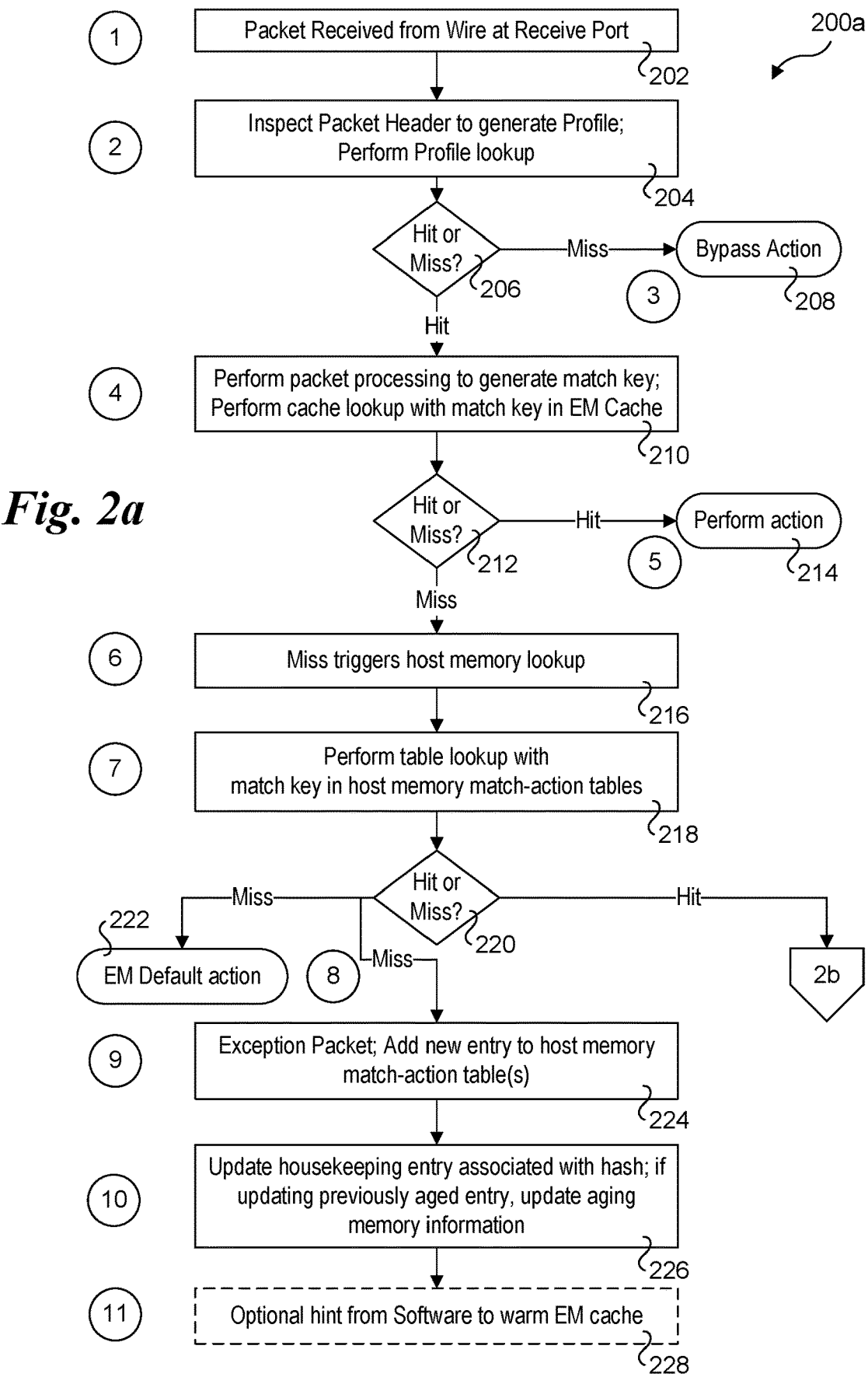
FIG. 2a is a flowchart illustrating operations and logic performed by the process illustrated in FIG. 1a, according to one embodiment.

FIG. 1a and flowchart 200a of FIG. 2a show operations and logic relating to creation of a new match-action entry in host memory match actions tables 108. The encircled numbers represent various operations that are used to match what is occurring in FIGS. 1a and 2a. The processing begins in a block 202 in which a packet 124 is received at a receive port in Port 1 from network 122, as depicted by a first operation '1'. In operation '2' and as depicted in a block 204, the packet header is inspected by packet processing pipeline 114 to identify a profile associated with the packet and perform a profile lookup. Generally, the profile lookup may determine whether the packet belongs to a flow for which a match-action entry exists or is to be generated, or is a type of packet for which a match-action does not apply. As depicted by a decision block 206 if the profile lookup results in a miss, a bypass action 208 is performed corresponding an operation '3'. For example, the bypass action may deliver the packet to a Physical Function (PF) driver or the like.

If the profile lookup results in a hit, the logic proceeds to a block 210 corresponding to an operation '4' in which packet processing operations are performed by packet processing pipeline 114 to generate a match key, which is then used to perform a EM cache lookup. As described in further detail below, the match key is used to identify a corresponding match action entry in an EM cache or host memory match action tables using a multi-hash scheme. In one embodiment, the match key is generated by performing a hash on packet header fields, such as an n-tuple hash. The resulting hash (match key) is used to uniquely identify packet flows, and these operations are somewhat analogous to packet flow/classification operations performed by a SmartNIC. As depicted by a decision block 212, if there is a matching entry, the cache lookup will result in a match, and the corresponding action defined by the matched match-action entry in the EM cache will be performed, as depicted in an end block 214 and an operation '5'.

If the lookup results in a miss, the logic will trigger a host memory lookup, as depicted in a block 216 and operation '6'. In operation '7' and a block 218, a lookup in the host memory match-action tables will be performed using the match key. As depicted in a decision block 220, if the lookup results in a hit the logic proceeds to flowchart 200b in FIG. 2b. If the lookup results in a miss, the packet is an exception packet, meaning it corresponds to a packet flow for which no currently match-action entry exists in host memory match action tables 108. Accordingly, an EM default action is performed for the exception packet in an end block 220 corresponding to operation '8'. In parallel, a match-action entry is added by software driver 106 to the host memory match action tables in a block 224 corresponding to operation '9'. In a block 226 corresponding to operation '10' the housekeeping entry associated with the hash (used for the new match-action entry) is updated. If the hash corresponds to a previously aged entry, then correspond aging information in host memory aging+housekeeping block 110 is also updated. In an optional block 228, a hint may be provided by software driver 106 to packet processing pipeline 114, as depicted by operation 11'.

Adding a Match-Action Entry to the EM Cache

Figure 1B:
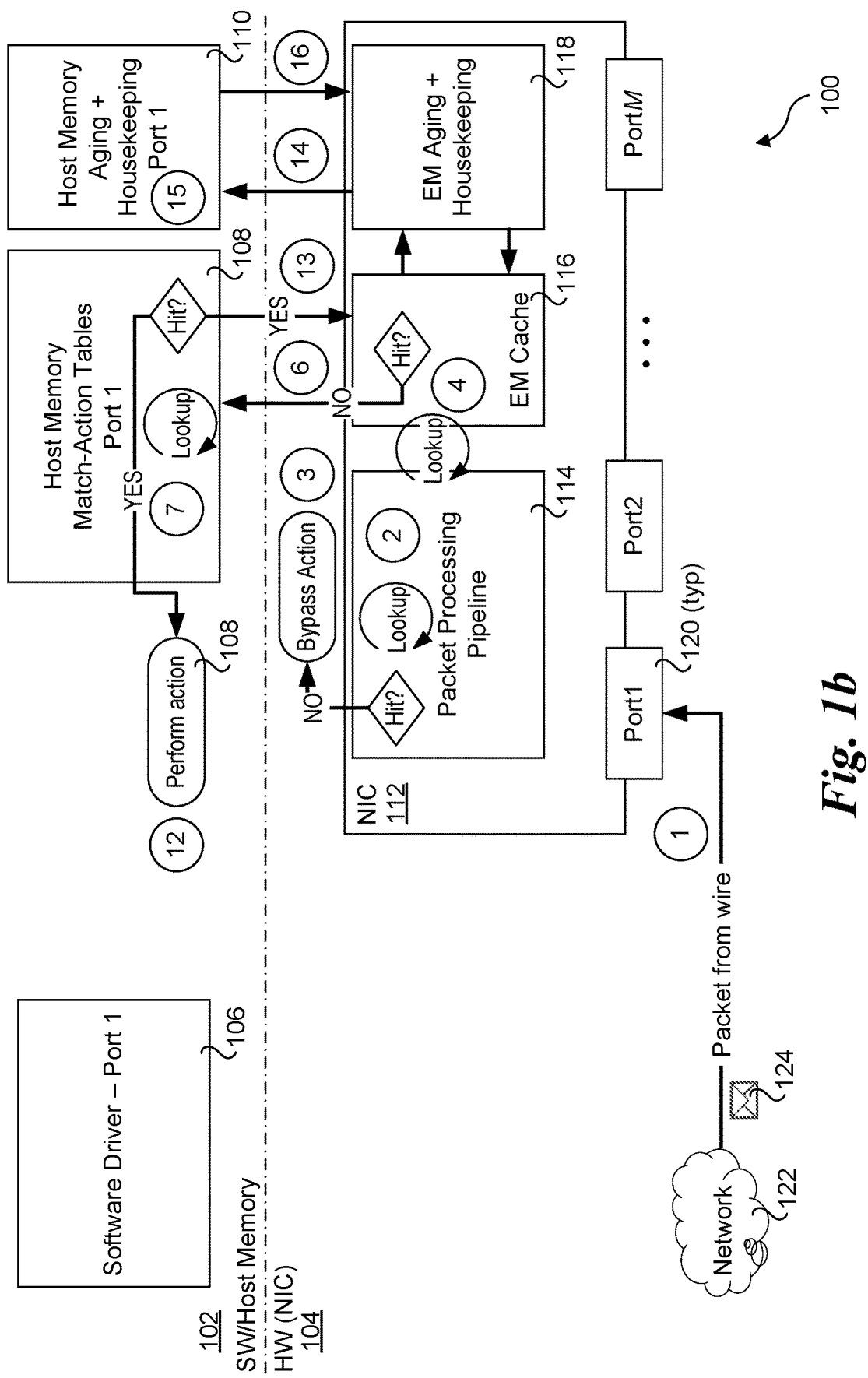
FIG. 1b illustrates processing and handling of a packet using the platform architecture of FIG. 1 under which there are no matches in the EM cache while there is a match in a host memory match action tables, resulting in adding the matched entry to the EM cache.
Figure 2B:
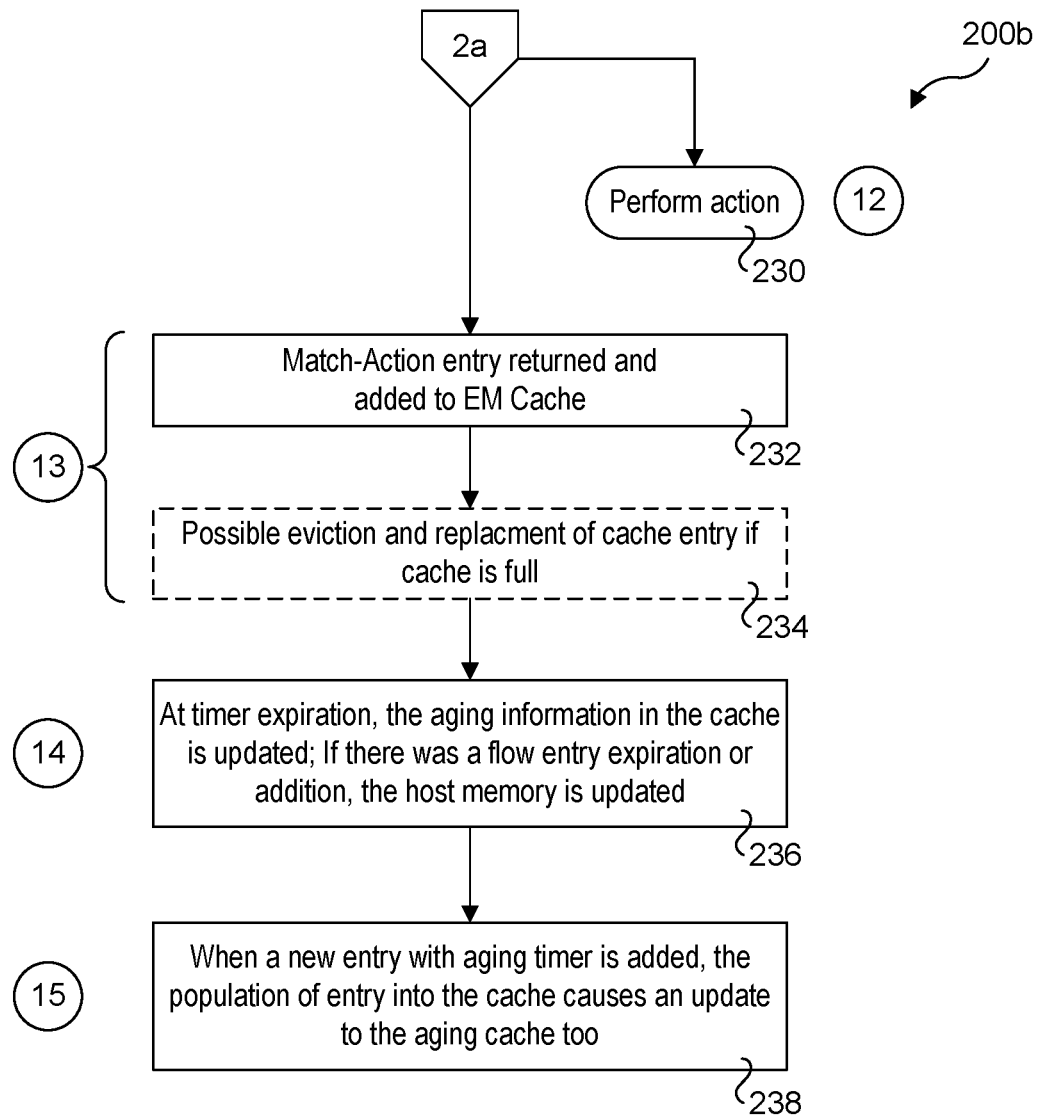
FIG. 2b is a flowchart illustrating operations and logic performed by the process illustrated in FIG. 1b, according to one embodiment.

FIG. 1b and flowchart 200b of FIG. 2b illustrate operations and logic for adding a match-action entry in EM cache 116. Operation 1-7 are the same as described above for FIG. 1a and flowchart 200a, with new operations commencing with a hit result for decision block 220, meaning there exists a match-action entry in host memory that matches the key. As shown in an end block 230 and an operation '12', the action for the match-action entry is performed. In parallel, the match-action entry is returned to EM cache and added to cache in a block 232 in conjunction with an operation '13'. If the EM cache is full, a current match-action entry is evicted and replaced by the returned match-action entry. Generally, any applicable type of cache eviction algorithm may be implemented, such as but not limited to Least Recently Used (LRU). The eviction and replacement of the match-action entry is depicted in an optional block 234.

In one aspect of some embodiments, an aging scheme is implemented such that match-action entries that haven't been used for a given time period are "aged" out, meaning they are removed or marked for removal from the host memory match-action tables and, if applicable, the EM cache. The aging scheme enables multiple match-action entries to be periodically removed from the host memory and EM cache, leaving room for new match-action entries.

In one embodiment, aging information is implemented for all or selected match-action entries. For example, the aging information might be a timestamp or a rolling counter. Generally, aging information may be kept in a separate data structure or it may be included in the same data structure as the match-action entries. One or more timers or counters may be used to remove (or mark to be removed) match-action entries that meet an aging criteria, such a difference between a current time and the time a match-action entry was last used exceeds a threshold. Further details of one embodiment of a table structure storing aging information and associated settings are discussed below with reference to FIG. 8.

As shown in a block 236 and an operation '14', at timer expiration the aging information in the EM cache is updated. If there was a flow entry expiration or addition, the host memory match-action tables are updated. As depicted in a block 238 and an operation '15', when a new entry with an aging timer is added, population of the entry into the EM cache causes an update to the aging cache too.

Figures 3, 6:
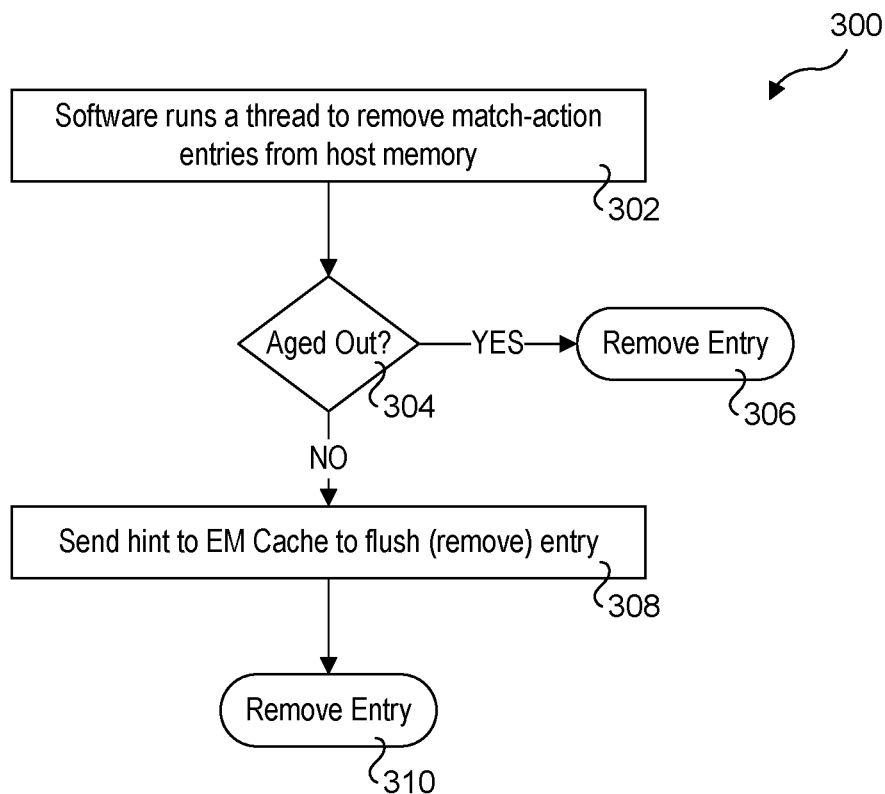
FIG. 3 is a flowchart illustrating operations and logic for removing an match-action entry, according to one embodiment.
FIG. 6 is a diagram illustrating a format for a collision hint entry, according to one embodiment.

FIG. 3 shows a flowchart 300 illustrating operations and logic for removing a match-action entry, according to one embodiment. As shown in a block 302, software runs a thread to remove match-action entries from host memory (e.g., match-action entries in host memory match actions tables 108). In a decision block 304 a determine is made to whether the entry is aged out. For example, in one embodiment aged-out entries are marked when they are aged out but are not immediately removed from host memory match actions tables 108. If the answer to decision block 304 is YES, the entry is removed in an end block 306. If the entry has not been aged out, then there is a possibility that the entry is cached in the EM cache. Accordingly, in a block 308 a hint is sent to the EM cache to flush (evict or remove) the entry. The entry is removed from host memory match actions tables 108 in an end block 310. Generally, the operations in block 308 and 310 may be performed in parallel or have their order reversed, with the net result being removal of a match-action entry from host memory match actions tables 108 and the EM cache (when the entry is cached in the EM cache).

A hash-table is an associative array that maps a key to a value. Access of the hash-table is based on generating an index into the table using a hash function that is operated on the key. Each entry in that table is called a bucket. A hash function applied to different keys might lead to the same bucket, resulting in a so called "collision." A hash-table is a commonly used search algorithm in packet processing hardware accelerators.

A key challenge with use of a hash-table, accelerated using hardware, is latency. More specifically, maintaining predictable, bounded low latency can improve performance of hash-table lookups. Latency is a direct derivative of the number of memory accesses required per lookup. In other words, the higher the number of memory accesses, the higher the latency. Moreover, fixed, predictable latency is crucial for communication protocols and is very important for workload balancing and timing sensitive pipelines. Traditional hardware-based hash-table lookup solutions suffer from non-fixed and unbounded latency.

Figure 4:
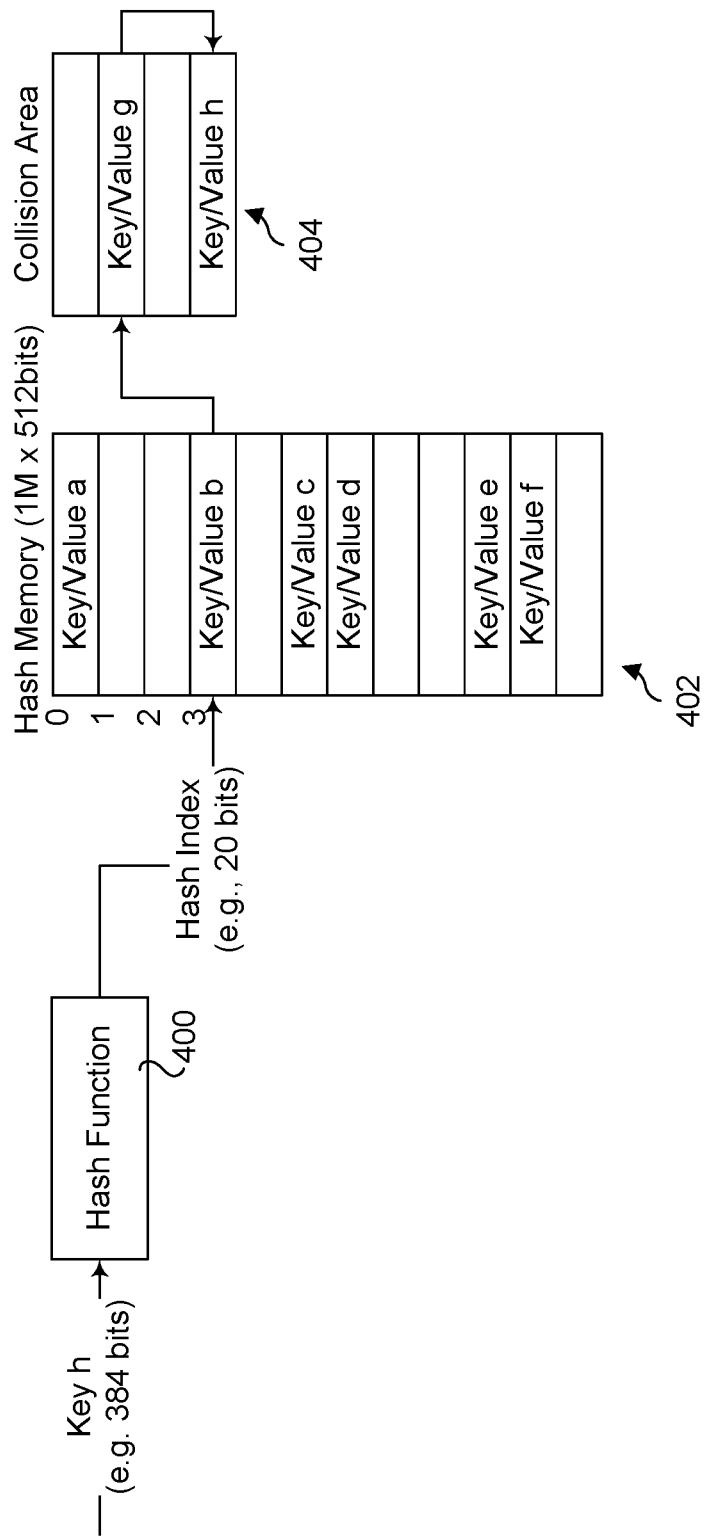
FIG. 4 is a diagram illustrating conventional used of a hash function and hash memory with a collision area.

FIG. 4 depicts an example of key-value look-up. A key h (e.g., 384 bits) is processed using a hash function 400 to generate a hash index (e.g., 20 bits). The hash index is used to look-up a value in a hash memory 402, a so-called key/value pair. However, hashing of the lookup key can create collisions between different keys such that multiple different keys map to the same index and entry in a look-up table. In the event of a collision, successive memory accesses into a table are made to find the matched key among the collision set in a collision area 404.

A common hardware implementation for collision resolution is known as link list separate chaining. Each entry is a linked list of all key-value pairs that belongs to the same bucket. The head of the list is pointed by the hash index. The rest of the entries are located in a separate memory area (e.g., collision area). In the case of a collision, a linked list is traversed to search for matching key-values. However, a link list size is not bounded, which can lead to unpredictable read time in case of collisions. Worst case latency can be considered the latency of a single memory lookup, multiplied by the maximal length of the link list. In a case where packets are to be transmitted or processed in order, large buffers are needed for packets to store packets during the lookup process. These buffers compensate for worst case latency. In addition, latency of packet processing using key-value look-ups can be non-deterministic or excessive.

In the example of FIG. 4, 8 keys are mapped into 6 hash indexes. If keys b, g and h are mapped to the same index 3, then a collision occurs for any of keys b, g and h. To resolve a collision, key b is linked to key g, which is linked to key h. Access to key h requires 3 cycles of memory reads. For larger numbers of keys mapped to the same index, the number of memory reads can grow.

Collision resolution involves multiple cycles of memory reads, which can cause latencies in key-value lookups. The ratio between the number of entries (n) and number of buckets (k) defines a load factor. A low value of a load factor assures a low probability of a collision, but dictates large unused memory area. Known literature describes methods in which a hash table consists of pointers and not full key-value pairs, thus reducing memory footprint, but indirect addressing is used, which can introduce double latency and bandwidth overhead, which is not desired for per-packet lookup. Existing solutions are designed to tolerate a maximum of 3 or even 4 memory accesses for each lookup before latency is unacceptable.

For networking devices, buffer sizes and processing engines are used along the pipeline to handle packet build up at least due to latency caused by hash-table lookups. Because networking traffic is (generally) an ordered stream of packets, processing a key-value look up for one packet where collision occurs can have a long latency impacts the latency of many of its successors, and creates a traffic jam that might introduce additional delay.

Multi-Hash Operations and Data Structures

Various embodiments herein provide for multi-hash operations, enabling reduction and bounding of latency with minor incremental increase of lookup bandwidth. Multi-hash operations can reduce latency practically to 1 memory access time, with the incremental investment of approximately 10% in memory access bandwidth and use of a small sized content associative memory (CAM). Various embodiments potentially use multiple hash functions in parallel and map entries into multiple hash tables. During entry add, if the primary hash table bucket is already occupied, the entry will go into the first hash table in which the bucket is vacant. In the case of a collision with another existing entry whereby an existing entry includes an index that is the same as an index generated from a hash function, an entry for the index is added to a first available table. A hint CAM is updated to indicate which other table(s) contain colliding entries to the one in the primary or default table.

For a lookup within a collision set, instead of serial search for the matched key in a collision set, various embodiments map the collided items into different hash tables. Accordingly, in the event of a collision, only relevant tables are accessed in parallel and matching from a table lookup can conclude within a latency of one additional memory access. The use of multi hash flow enables a wide range of hardware solutions, which share the ability to create an upper bound of the latency of the lookup (predictable latency), usually to a much lower number than the average latency of existing solutions. Various embodiments also provide an ability to tune performance versus cost tradeoffs, unlike most of the known solutions that are software-oriented algorithms.

Various embodiments provide a streamlined processing of packets in a pipeline with no iterative access to memory, and very rare exception cases. When attempting to add a new entry (e.g., key-value pair corresponding to an index generated from a hash of a key) to a table but the primary (default) and all secondary tables are full (e.g., have no free entry), such that a new entry cannot be added to a table. In the case of such exception, handling is passed to software (e.g., a driver for a network interface) as a condition that leads to cleaning up the primary or secondary tables to evict one or more entries to free entry space to add a new entry. As multi-hash exception probability is very low, it enables ignoring the performance impact of these exceptions when designing the lookup pipeline. For addition or removal of entries, actions can be performed as atomic operations. Unlike link list management, which requires modification of previous and/or next item in the list for adding a new item, for atomic operations, once an entry is written to the table, the entry is valid and active. Here again, the flow enables on the spot execution, rather than iterative modification.

Figure 5A:
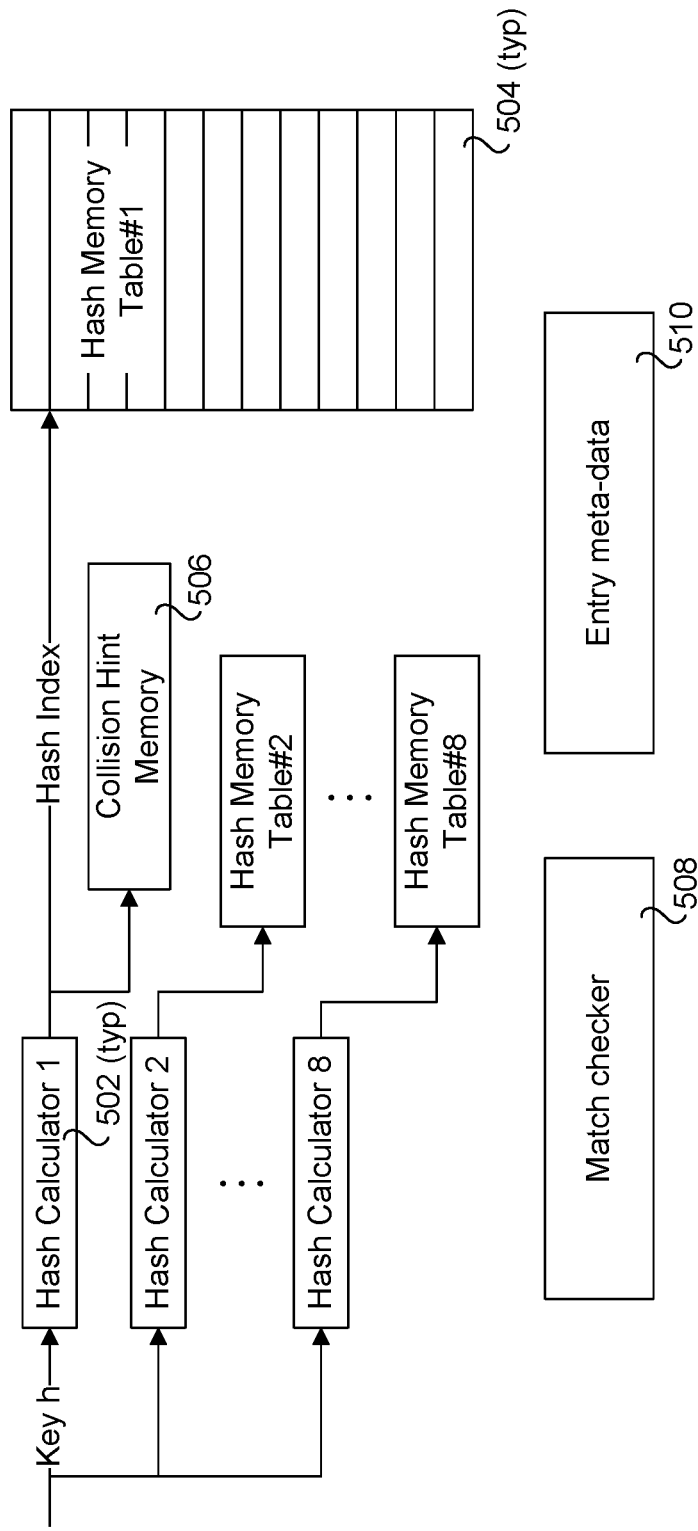
FIG. 5a is a diagram illustrating a multi-hash scheme under which multiple hashes may be employed in parallel to identify an index in a hash memory table in which an entry is to be stored.

FIG. 5a depicts an example of a system 500a. The system includes M (8 in this example) hash-table 504 potential lookups using M hash calculators 502 running in parallel and an optional on-die associative memory (CAM) for capturing collision hints depicted as collision hint memory 506. System 500a further includes a match checker 508 and entry meta-data 510. A key h can be received by the system (for example, the key can be 384 bits or other size). Hash Calculator 1 calculation is performed on the key and denoted hash1(key) and a lookup of an entry in Hash Memory Table 1 occurs using the hash index resulting from hash1(key). Hash Calculator 1 can be any operation such as one or a combination of SHA256, MD5, Toeplitz, checksum, or CRC32 using a same or different portion of a key. A different hash calculation can be generated for Hash Calculator 1 to Hash Calculator 8 using different hash functions using the same or different key or using the same hash function but using or selecting a different private key for the hash engine. Generally, Hash Calculator 1 to Hash Calculator 8 can be performed using applicable hardware such as a central processing unit (CPU), core, graphics processing unit (GPU), field programmable gate array (FPGA), or application specific integrated circuit (ASIC).

For adding a new key-value pair into Hash Memory Table #1, if an entry in the Hash Memory Table #1 is vacant or Hash Memory Table #1 has memory space to add an entry, the new entry (e.g., key-value) is added in the Hash Memory Table #1. Collision hint memory 506 (e.g., hint CAM) indicates no collision for an index resulting from hash1 (key).

In the case of a collision with another existing entry whereby an existing entry in Hash Memory Table #1 includes an index that is the same as hash1(key), an entry for hash2(key) is added to a first available table (e.g., Hash Memory Table #2), where hash2 is different from hash1 or hash2 generates a different index than hash1 for the same key or input. In addition or alternatively, in some examples, hint2 can operate on different portions of the key than hash1 and use the same or different hash function. Collision hint memory 506 is updated to indicate which other table(s) to inspect other than Hash Memory Table #1. In this example, collision hint memory 506 is updated to identify Hash Memory Table #2 (hash memory 2). A next time an index is calculated that matches hash1(key) for any key, collision hint memory 506 identifies Hash Memory Table #2 (hash memory 2) as another table to search for an entry. For a subsequent access using a same index resulting from hash1 (key), when there is a unique match based on hash1(key) in Hash Memory Table #1, the entry is retrieved from hash memory 1 and used to access a key-value pair. For a unique match based on hash2(key) in hash memory 2, the entry is retrieved and used to access a key-value pair. If the key in the key-value pair matches the provided key, the value is provided to the requester.

In the case of a collision with another existing entry in hash memory 1 where an existing entry includes an index that is the same as hash1(key), an entry for hash2(key) is attempted to be added to a first available table (e.g., hash memory 2). However, if hash memory 2 also has an existing entry that includes an index that is the same as hash2(key), where hash2 is a different function than hash1, an entry is added to a first available table (e.g., Hash Memory Table #3) based on hash1(key), where hash1, hash2, and hash3 are different hash functions or produce different indexes for a hash calculation on the same key. Collision hint memory 506 is updated to indicate which other table(s) to inspect other than Hash Memory Table #1. In this example, collision hint memory 506 is updated to identify tables 2 and 3.

For a subsequent access using a same index resulting from hash1(key), when there is a unique match based on hash1 (key) in hash memory 1, the entry is retrieved from hash memory 1 and used to access a key-value pair. For a unique match based on hash2(key) in hash memory 2, the entry is retrieved and used to access a key-value pair. For a unique match based on hash3(key) in hash memory 3, the entry is retrieved and used to access a key-value pair. If the key in the key-value pair matches the provided key, the value is provided to the requester.

Various embodiments attempt to populate a new entry in the first table on which the bucket is vacant. This means that the probability of an entry to go into Hash Memory Table #2 is equal to Pcol(2). In the example of load-factor of ¼, probability is approximately 11%. Therefore, the second table size can be smaller by the same ratio. So, table size can be dramatically reduced with table index.

In some embodiments, collision hint 506 includes information about the population of Hash Memory Tables #2-8.

If an entry is added to Hash Memory Table #2 or higher numbered table, the entry is captured in the collision hint memory 506, which associates hash index of Hash Memory Table #1 and the usage status of the bucket in Hash Memory Table #n. For example, if 3 different keys have the same hash1(key) for Table #1 (same hash1(key) value), the second entry will be put in Hash Memory Table #2 and third entry can be placed in Hash Memory Table #2 or Hash Memory Table #3, as hash2 of those keys is likely to be different. Collision hint memory 506 will indicate that for hash1(key), Hash Memory Table #2 and Hash Memory Table #3 are to be accessed also if the second key is in Hash Memory Table #2 and the third key is in Hash Memory Table #3.

Collision hint memory for storing collision hints 506 can be implemented using a content addressable memory (CAM) or other memory or storage device. The memory can be on-die with the processor or accelerator that performs the hash functions. For example, on-die can refer to placement of devices on the same integrated circuit, circuit board, or chip packaging.

In this example, the average occupancy of that collision hint memory 506 is approximately Pcol(2). In case there are 0.25 million keys and 1 million buckets in Hash Memory Table #1, the CAM size shall have approximately 30,000 entries with 20-bit word size.

Collision hint memory 506 can store an indication of: for a hash1(key), what hash memories tables other than Hash Memory Table #1 (e.g. default table) to look for an entry or entries. If another table or tables have an entry for hashX (key) then a corresponding hash function X (where X is one or more of values 2 to 8 in this example) on the key for the other tables identified in collision hint memory 506 can be performed and read in parallel. In some embodiments, one (1) memory read cycle is used to read collision hint memory 506 and perform other reads in one or more of tables 2-8 for respective hash functions 2-8. In other words, a search for keys in entries in the Hash Memory Table #1 and any of Hash Memory Tables #2 to #8 for a match with the received key can occur in a single memory read cycle. An entry in collision hint memory 506 can be multiples bits and store an index of hash1(key1) and include an identifier of which other table to perform a lookup of (e.g., any of tables 2-8), although other numbers of tables can be used. In many cases, there is no collision and collision hint memory 506 will not have a record for a hash1(key). A non-limiting example of an entry in collision hint memory 506 is provided with respect to FIG. 6.

As an example, hash1(key) is used to store an entry in Hash Memory Table #1. However, if hash1(key2) collides with hash1(key1) and Hash Memory Table #2 is full, an entry for hash1(key2) is placed in Hash Memory Table #3. An entry in collision hint memory 506 is added to indicate hash1(key1) and hash1(key2) have items in Hash Memory Table #1 and Hash Memory Table #3. So, during lookup of hash1(key1) or hash1(key2), consulting collision hint memory 506 will indicate to read Hash Memory Table #1 and Hash Memory Table #3.

If collision hint memory 506 shows that Hash Memory Table #2 and Hash Memory Table #3, for example, are valid (e.g., a counter value is greater than zero), then a read request for these additional hash tables will also be issued. In that case, three memory requests (for Hash Memory Table #1 to #3) will be performed in one cycle and at least partially in parallel. Multiple hash calculation operations and accesses to memory can occur in parallel within a single memory read cycle. But only one of the lookups from Hash Memory Tables #1 to #3 is expected to match. Match checker 204 can perform a comparison between a received key and a key in a retrieved entry to determine if there is a match and provide the associated value to a requester.

A difference between this type of memory request and the traditional link-list, is that in link-list the requests are serial would consume 3 times latency (e.g., 3 memory read cycles). For a match of the received key with a key in a retrieved entry in a table, the corresponding value can be provided to a requester. Only one of Hash Memory Tables #1 to #3 will have an entry with a key that matches the received key.

In some examples, Hash Calculators 1-8 can all apply different hash functions or apply the same hash function but use different private keys such that a hash of the same key by the Hash Calculators 1-8 result in different values/indexes. In addition, a hash memory table is available corresponding to each hash function. For example, Hash Calculator 2 has corresponding Hash Memory Table #2 with entries corresponding to a hash2 function on a received key, Hash Calculator 3 has corresponding Hash Memory Table #3 with entries corresponding to a hash3 function on a received key, and so forth up to Hash Calculator 8 has corresponding Hash Memory Table #8 with entries corresponding to a Hash Calculator 8 on a received key. The possibility of collisions for all of hash1(key) to hash8(key) is virtually zero. Accordingly, by finding a match in a hash memory other than Hash Memory Table #1, the entry can be used to retrieve the key-value pair and verify whether the value can be provided if the key is verified.

For addition of an entry, the lookup shall be more extensive, and shall include all hash tables, and not only those marked in collision hint memory 506. The reason is that collision hint memory 506 shows only the collision set of Hash1(subject key) (set of keys that map into same bucket in Hash Memory Table #1) and does not show other collision sets of different hash1(other key) entries. So, when looking for the first available table for a specific Hash1, all tables are searched.

Removing an entry from collision hint memory 506 also starts with a full lookup process. The lookup process identifies the exact location of the entry. A removal process can involve also compressing the collision set to the lowest possible table index. For example, if for a specific hash1, there is an entry in Hash Memory Table #1 and in Hash Memory Table #3, and the entry in Hash Memory Table #1 is to be removed, then the entry in Hash Memory Table #3 shall be moved to Hash Memory Table #1. Various embodiments attempt to shrink the size and number of tables to contiguous table indexes and to reduce memory used or allocated for use by hash memories or tables.

The average number of entries in each table is significantly smaller than a number of entries in its predecessor table. Accordingly, the size of the hash tables and the memory size can become exponentially smaller, as the index grows. Accordingly, a number of tables can be bounded.

Many implementations have used either very large associative arrays (e.g., CAMs), or basic hash-tables with link-list flows to resolve collision events. Various embodiments bring the desired pipeline nature of associative array that can occur within a single cycle, with the hardware cost and simplicity of a hash table flow.

For example, the requester can be a virtualized execution environment that performs or requests packet processing using key-value lookup. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux and Windows Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Any CPU node or virtual machine can perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run as virtual machines (VMs) or in virtual execution environments. VNFs can be linked together as a service chain. In some examples, EPC is a 3GPP-specified core architectures at least for Long Term Evolution (LTE) access. 5G network slicing can provide for multiplexing of virtualized and independent logical networks on the same physical network infrastructure.

Figure 5B:
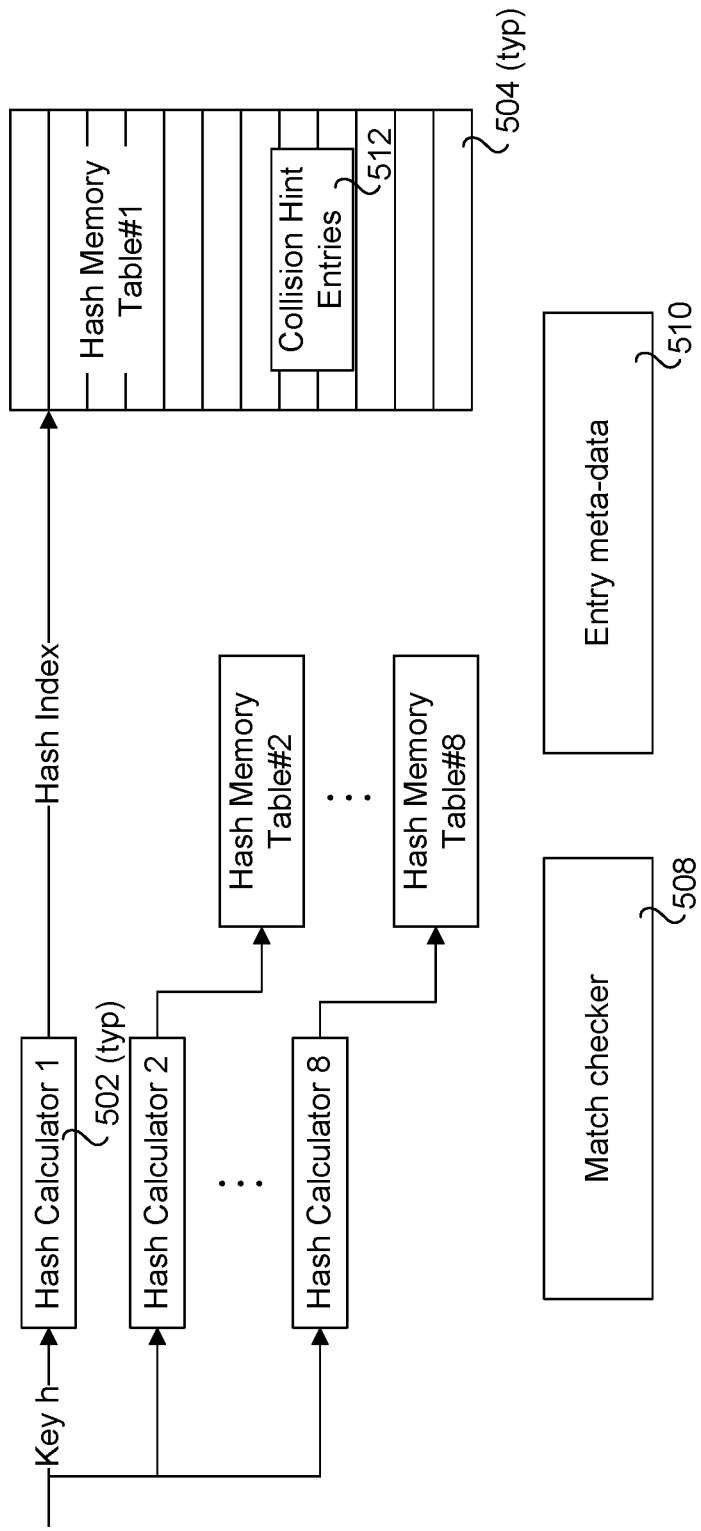
FIG. 5b is a diagram illustrating a variant of the scheme in FIG. 5a under which collision hint entries are stored in a first hash memory table.

FIG. 5b depicts an example of a system 500b. In this example, the system can use Hash Calculators 1 to 8, however any number of hash calculators can be used such as 2, 3, 4, or more. Hash Calculator 1 can perform any hash operation such as one or a combination of: SHA256, MD5, Toeplitz, checksum, or CRC32 using a same or different portion of key h. A different hash calculation can be performed by each of Hash Calculator 1-Hash Calculator 8 for the key h. For example, different hash calculations can be generated by selecting a different private key for a hash engine. In this example, the collision hint memory is not used. The information captured in the collision hint memory (collision hint entries) can reside in host memory, as part of the Hash Memory Table #1. Hash Calculator 1 performs a hash calculation on key h. Key h can be any type of information such as a portion of a packet (e.g., header value(s)) or a key for a lookup for an entry in a database. Hash Calculator 1 generates a hash index based on the key h. The hash index is provided to Hash Memory Table #1. A lookup for hash1(key h) will start with single memory request according to the hash1 index looking up entries in Hash Memory Table #1.

In this example, collision hint information is stored inside entries of Hash Memory Table #1, as depicted by collision hint entries 512. If more tables are to be searched in addition to Hash Memory Table #1, then a second lookup is initiated for all relevant tables identified in the hint entries in Hash Memory Table #1. This flow saves the need for on-die CAM or memory, but makes the lookup time to be 2 read cycles of Hash Memory Table #1 and at least one other table (in case of collision) in parallel. If another table or tables have entry/entries for (key), then those table(s) are read (in parallel). In other words, a search for entries in Hash Memory Table #1 for a match of the key and the search of any other hash table for a match of the received key can occur within a duration of two memory read cycles.

For example if collision hint information looked-up for hash1(key h) identifies any of Hash Memory Table #2 to Hash Memory Table #8 for searching, then in a subsequent (e.g., next or later) read cycle, a corresponding hash function is performed on key h to generate one or more indices and a read operation is performed to identify an entry corresponding an input index in the corresponding Hash Memory Table. For example, if Hash Memory Table #2 and Hash Memory Table #3 are identified in the collision hint as storing an entry corresponding to hash1(key h), then Hash Calculator 2 and Hash Calculator 3 calculate a respective index 2 and 3 based on key h. As Hash Calculators 2 and 3 generate different index values for key h, the index 2 and index 3 are different values. The index 2 is used to perform a look-up of an entry in Hash Memory Table #2, whereas the index 3 is used to perform a look-up of an entry in Hash Memory Table #3. For a match of key h with a key in a retrieved entry from either Hash Memory Table #2 or Hash Memory Table #3 (but not both), the corresponding value can be provided to a requester that provided key h.

FIG. 6 depicts an example of formats of content stored in a collision hint memory or in a default hash memory table. The format of an entry 600 can be used for the embodiments of FIGS. 5a and/or 5b. An example content of an entry may include: index value, search table 2 counter, search table 3 counter, search table 4 counter . . . search table 8 (count). If a counter is zero, then the corresponding table does not store an entry corresponding to a hash on a key. If any search table counter is zero, there is no relevant entry and a search of the corresponding table is not performed. If a counter is greater than zero, then a search is to performed on another table. For any search table counter indicating a count>0, a search is performed of an entry in that table with an index that is generated using a hash calculation for that table. For example, if table2 has a search table #2 counter that is non-zero and table3 has a search table #3 counter that is non-zero, then an index is generated for table 2 using hash function 2 and another index is generated for table 3 using hash function 3 and a lookup can take place for entries in tables 2 and 3 in parallel using generated indexes.

A lookup table (e.g., Hash Memory Table #2-Hash Memory Table #8) can grow or shrink by adding or removing entries. A search table counter value can be used to track additions or removals of table. An entry addition involves writing the entry into a table, and incrementing the hint counter accordingly to indicate that a table has an additional entry that has been added. In some examples, Hash Memory Table #1 does not have a hint counter as it is always searched. However, Hash Memory Table #1 can have associated meta data for use to determine which entry to evict from Hash Memory Table #1. If an entry is added to any of Hash Memory Table #2 to Hash Memory Table #8, the corresponding table counter is incremented.

Removal of an entry from a Hash Memory Table can involve decrementing a table counter. For example, if a software (e.g., driver) or administrator clears any table or removes any entry from a table, the table counter can be reduced for the corresponding Hash Memory Table. For example, one or more entries can be removed, or all entries removed from a table if a network connection between a source and a receiver device ends or if a table is full and an entry is identified for removal.

In other examples, counter can be replaced with a yes/no hint (e.g., 1 bit) so that there is merely an indicator of whether to search another table. For example, search table #2=yes would indicate a Hash Calculator 2 would be performed using the received key and a search of Table #2 for the generated index is to take place. Search table #3=no would indicate a Hash Calculator 3 would not be performed using the received key and a search of Table #3 for the generated index is not to take place.

A maximum collision is a case in which adding a key cannot be supported as all table buckets for that specific key are occupied. FIG. 5 shows an example for the average time it would take to reach max collision. In this example, Add/Remove rate is 1 Million OPs/Sec, and the table is fully populated with load factor of ¼. The more tables that are used, the time for such event becomes longer. In that example, for 8 tables it would take 4*10^67 years, which is practically never.

As the probability for such event is low enough, it might be acceptable to reject the add request (fail action) and involve processor-executed software algorithms to allow software to resolve the issue, e.g., clean-up the table to remove unused elements to free-up space for new entries. For example, least recently used (LRU) entries (e.g., entries that are accessed least over a time interval) can be identified as candidates for removal from a table. For example, as shown in FIGS. 5a and 5b, entry meta-data 510 can be used to identify a number of accesses of any entry over a time period and be used to identify whether an entry is LRU.

Figure 7A:
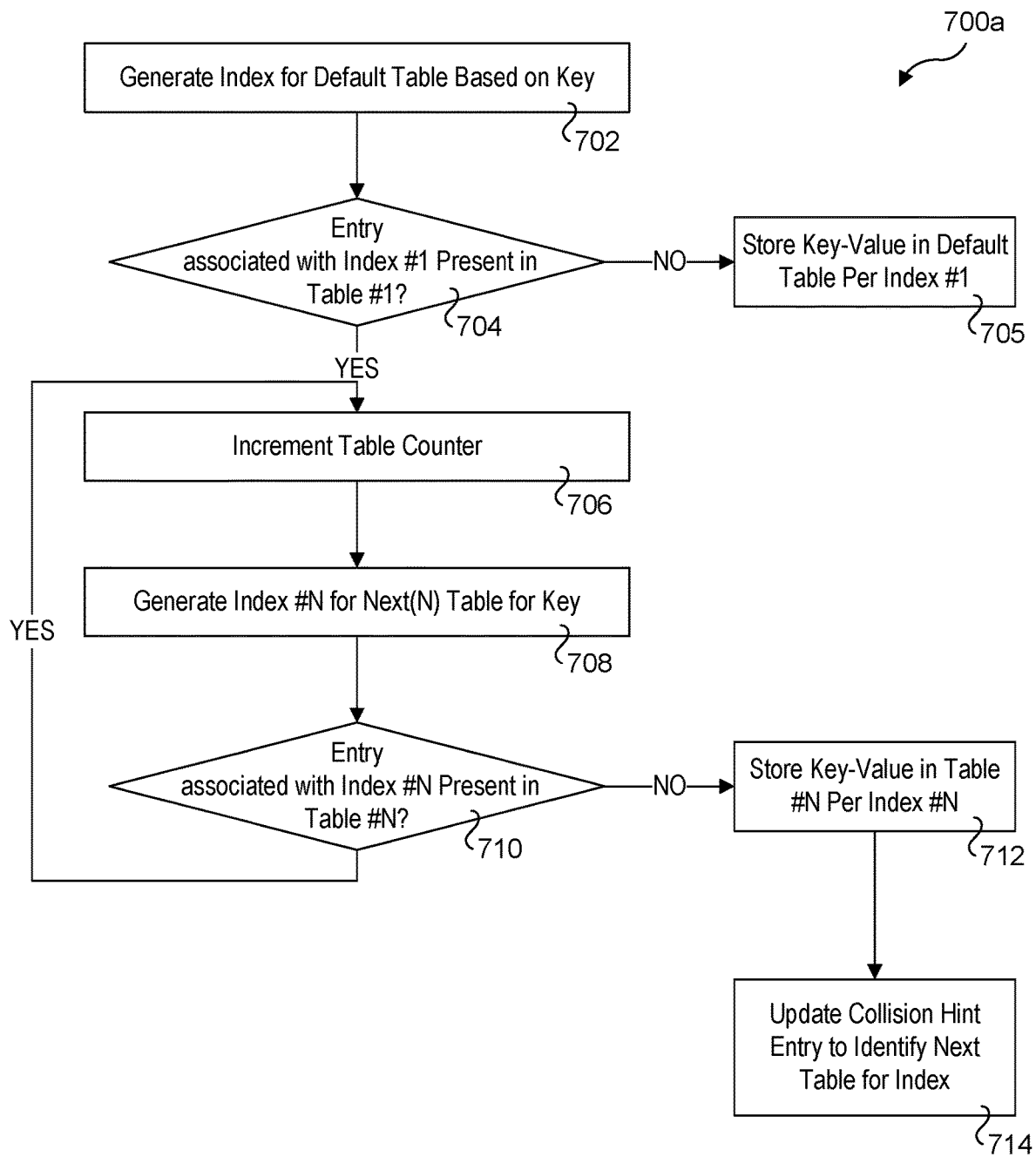
FIG. 7a is a flowchart illustrating operations for storing a new entry using the multi-hash scheme of FIGS. 5a and 5b.

FIG. 7a shows a flowchart 700a illustrating operations and logic for an example process to store a key-value entry in a table for access using an index. In a block 702, an index is generated for a received key. An index (index #1) can be generated from a hash calculation on a key. Any type of hash function or truncation operation can be performed. In a decision block 704, a determination is made if an entry for an index is present in a table. A search can be performed for entry in a default table (e.g., table #1). If an entry with generated index is present in the default table, then the process proceeds to a block 706. If an entry with the generated index is not present in the default table, the logic proceeds to a block 705 and stores an entry with an index to a key-value in the default table in storage or memory.

In block 706, a table counter is incremented to identify a next table. In this example, variable N is used to identify a table counter and N is incremented by 1. For example, a default table has a counter value of 1 and a next table counter is 2.

In a block 708, an index is generated using a hash calculation for the table counter value. In other words, for a table counter N, hash function N is performed on the key to generate an index to table N. Generating an index from hash function N can use a different hash function than used in for the default table or performing a same operation but using a different hash private key. In a decision block 710, a determination is made if an entry associated with the generated index is present in the table N. For example, table N is searched using the index generated for table N. If there is no entry associated with the index is present in the current table N, the process proceeds to a block 712. If any entry is associated with the index is present in the current table N, the process returns to block 706 to identify a next table, table N+1.

In block 712, a key-value pair is stored in the table N. A key-value pair can be a combination of a packet header portion and an action. A key can be any portion of a packet (e.g., header or payload). For example, a key can be a source IP address, destination IP address, source port number, destination port number, or protocol in use. The value can identify a packet processing operation (e.g., action), a value in a database, blockchain database, multi-media asset (image, video, website). An action can specify a set of packet processing actions to perform on the header or packet. For example, packet processing operation can refer to one or more of: sending the packet to a particular port, sending the packet to a particular next destination, modifying one or more header field values, dropping the packet, mirroring the packet to a buffer, discard the packet, flow classification, TCP termination, Address Resolution Protocol (ARP), access control list, routing service function chains (firewall, access control, decapsulation, packet processing), firewall, email server, Domain Name System (DNS), virtual private network (VPN), backup and remote file sharing, and so forth.

In a block 714, a collision hint table is updated to identify the next table with a free entry that stores an index to the key-value. The collision hint table can be in a separate memory or as part of an entry for Table #1. In some cases, a collision hint entry for a table to which an entry is added can be incremented to identify that another entry has been added to the table. Accordingly, the collision hint table can be used to identify which other tables to search other than a default table for a particular generated index. The generated index can be the same even for different keys.

Figure 7B:
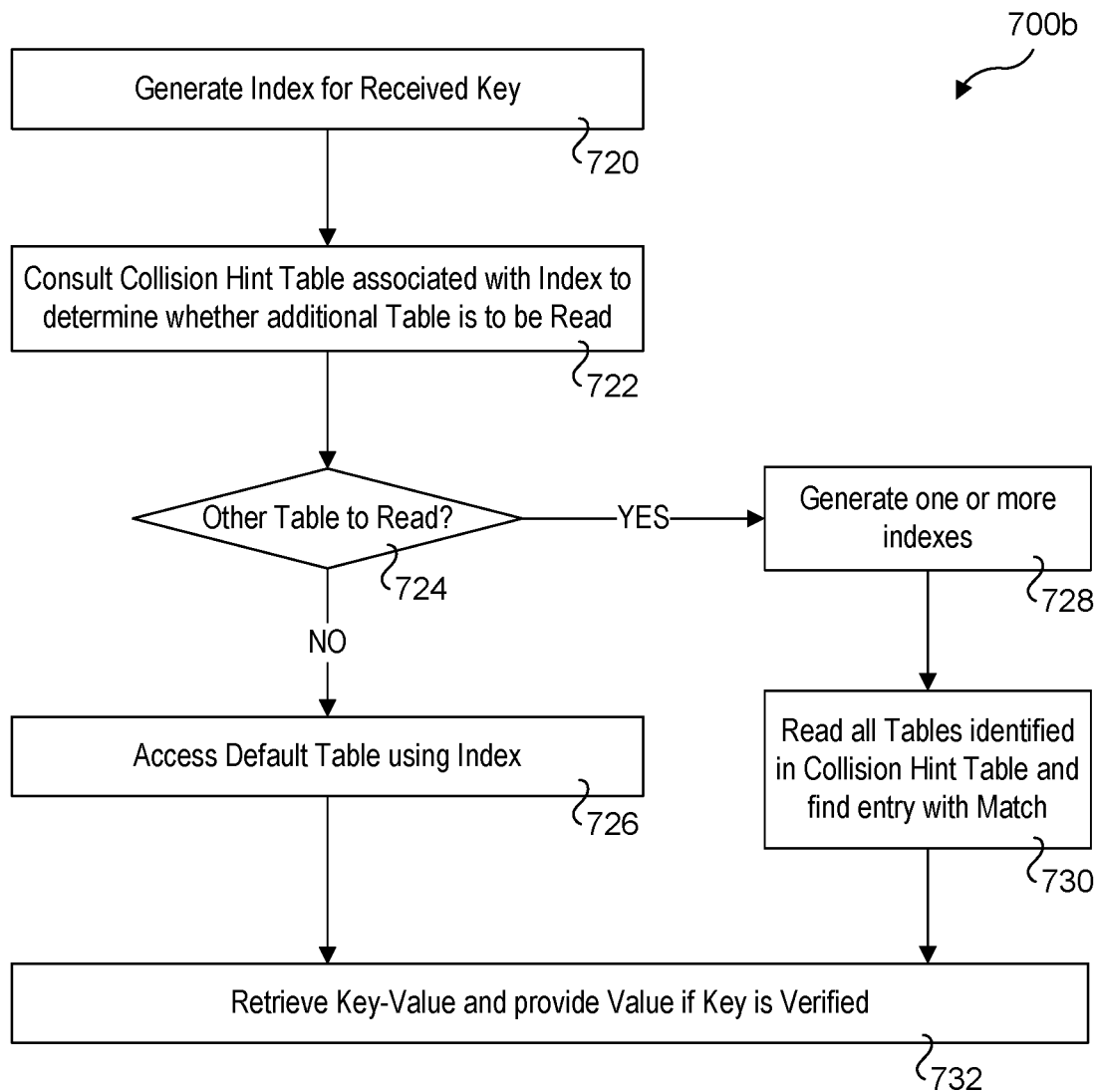
FIG. 7b is a flowchart illustrating operations and logic for performing a match lookup using multi-hash scheme of FIGS. 5a and 5b.

FIG. 7b shows a flowchart 700b illustrating an example process to retrieve a key-value. In a block 720, an index is generated for a received key. A key can be a portion of a packet (e.g., header and/or payload). For example, a key can be a source IP address, destination IP address, source port number, destination port number, or protocol in use, or may be a concatenation of multiple header fields. The index can be generated by a hash calculation. A hash calculation can be any of: SHA256, MD5, Toeplitz, checksum, or CRC32. In a block 722, a hint table is consulted to identify all tables to read based on the index. A collision hint table can be consulted to determine any other table than a default table stores entries associated with a hash of the received key. The collision hint table can be stored in a content addressable memory or in a default table.

In a decision block 724, a determination is made whether any other table is to be accessed or read other than the default table. If another table is to be accessed or read, then then the logic proceeds to a block 728 in which one or more other indexes are generated. The one or more other indexes can be calculated using hash functions associated with identified tables and each of the hash calculation is different from the hash calculation used in block 720 and from other another, or generate different indexes for the same key. In a block 730, the process reads one or more other tables specified in the collision hint table to identify an entry associated with one or more other tables. One or more other tables can include the default table and/or one or more other tables than the default table. The process proceeds to a block 732.

If a determination is made that another table is to not to be accessed (in decision block 724), the logic proceeds to a block 726 in which the default table is accessed to find an entry associated using the generated index in block 720. The process the proceeds to block 732.

In block 732, the entry is retrieved from the default table and zero or more additional tables. If the key in an entry matches the received key, a value associated with the key is provided. If a key in the retrieved key-value matches a key used to generate the index (received key), the corresponding value is provided to the requester. The value can identify a packet processing operation, a value in a database, blockchain database, multi-media asset (image, video, website). For example, packet processing operation can refer to one or more of: sending the packet to a particular port, sending the packet to a particular next destination, modifying one or more header field values, dropping the packet, mirroring the packet to a buffer, discard the packet, flow classification, TCP termination, Address Resolution Protocol (ARP), access control list, routing service function chains (firewall, access control, decapsulation, packet processing), firewall, email server, Domain Name System (DNS), virtual private network (VPN), backup and remote file sharing, and so forth. In some examples, the entry includes a pointer to memory or storage from which to retrieve a key-value corresponding to the calculated index.

Figure 7C:
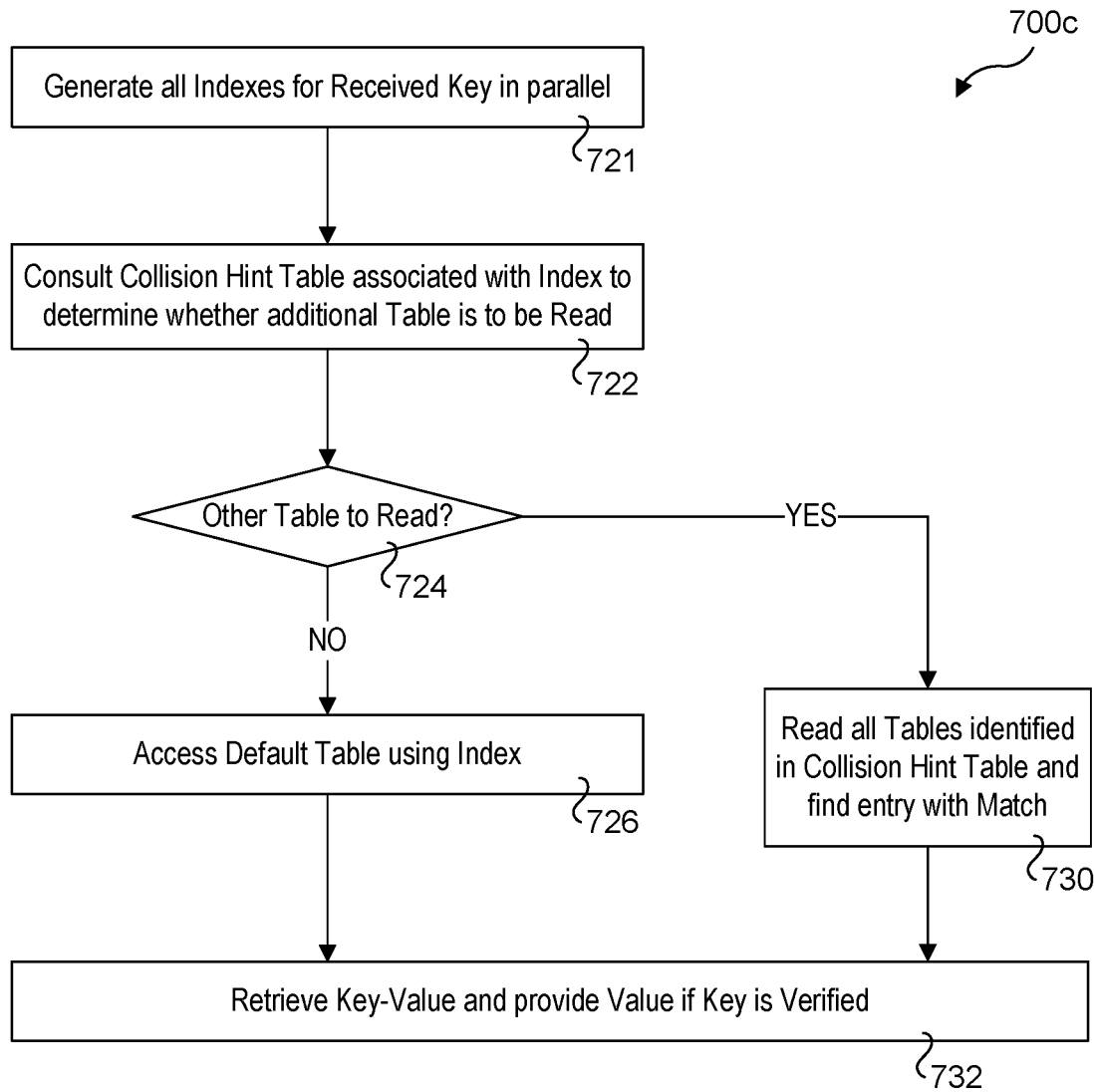
FIG. 7c is a flowchart illustrating a variant of the flowchart of FIG. 7b under which all indexes are proactively generated in parallel.

FIG. 7c shows a flowchart 700c comprising a modified version of flowchart 700b under which all indexes for the receive key are proactively generated in parallel, as shown in a block 721. For example, when hash calculators are implemented in hardware, such an on a NIC or other type of network interface, they may be implemented in parallel with no increase in latency. As a result, block 728 in flowchart 700b can be skipped, removing the latency incurred to separately calculate key indexes. Thus, following a YES result for decision block 724 the logic proceeds to block 730 to read all the tables identified in the collision hint table. In some embodiments, the table lookups may be performed in parallel.

Note that the examples in flowcharts 700b and 700c assumes that there is a match in a table between an index and an entry. If there is no match, then an indication can be provided to the requester of that no match was found.

FIG. 8 shows a format of an aging entry, according to one embodiment. A counting type column 802 defines whether the counter (time) is free running or auto refreshing. A timer resolution column 804 contains entries defining a resolution of each count. The timer count down value is defined in a count down value column 806. Status column 808 included a value defining the status of an entry. Etc. column 810 represents one or more optional additional columns. In addition to the columns shown, there will be one of more columns used to identify the index of the corresponding match-action entry in a match-action table or EM cache, as applicable.

Figure 9:
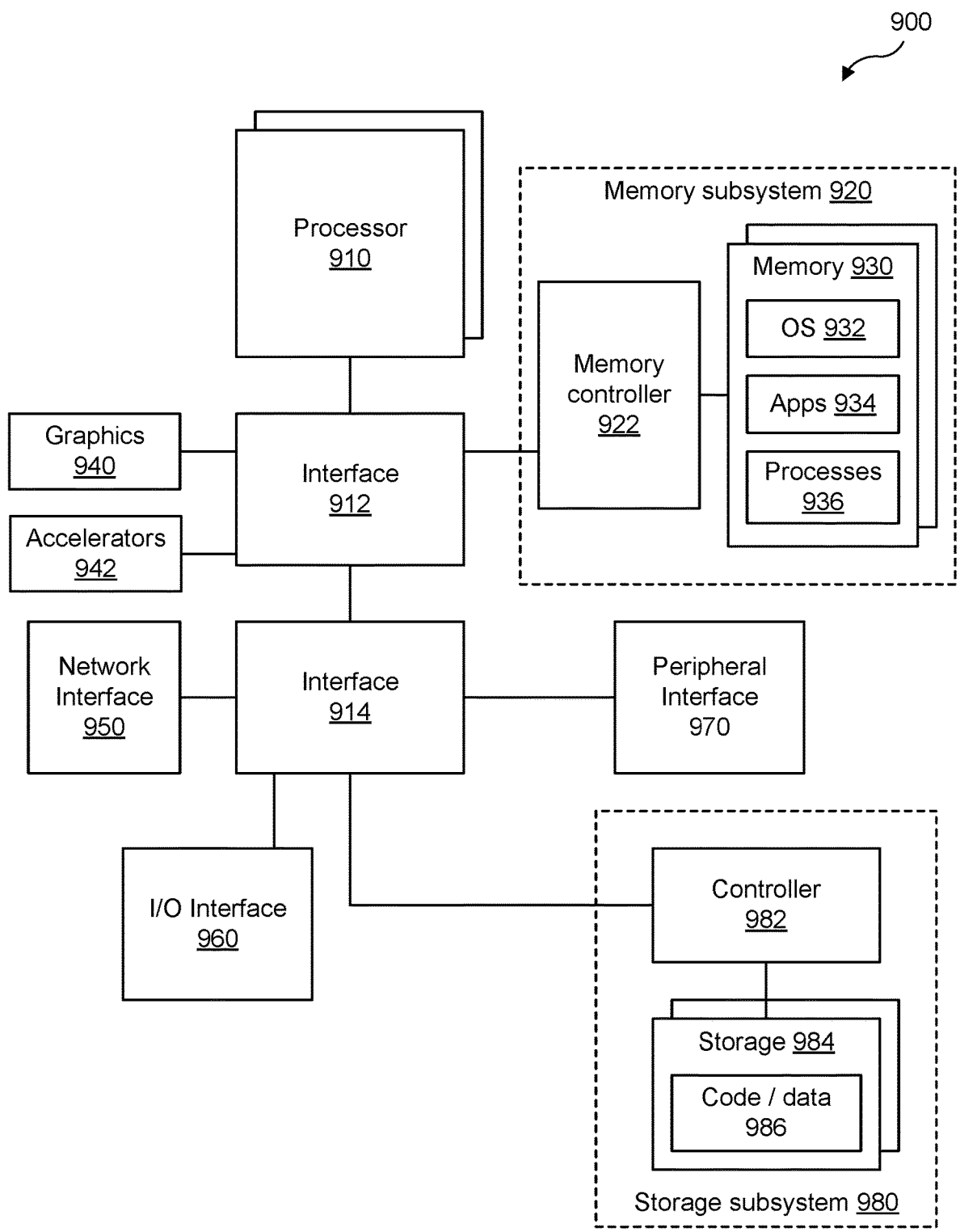
FIG. 9 is a schematic diagram of a system in which embodiments herein may be implemented.

FIG. 9 depicts a system 900. The system can use embodiments described herein to perform key-value look-up operations for any type of information including packet processing match-action look up operations for received packets. System 900 includes processor 910, which provides processing, operation management, and execution of instructions for system 900. Processor 910 can include any type of microprocessor, central processing unit (CPU), graphics processing unit (GPU), processing core, multi-core processor or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU socket (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include stand-alone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (i.e., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (i.e., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR3 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB- RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Figure 10:
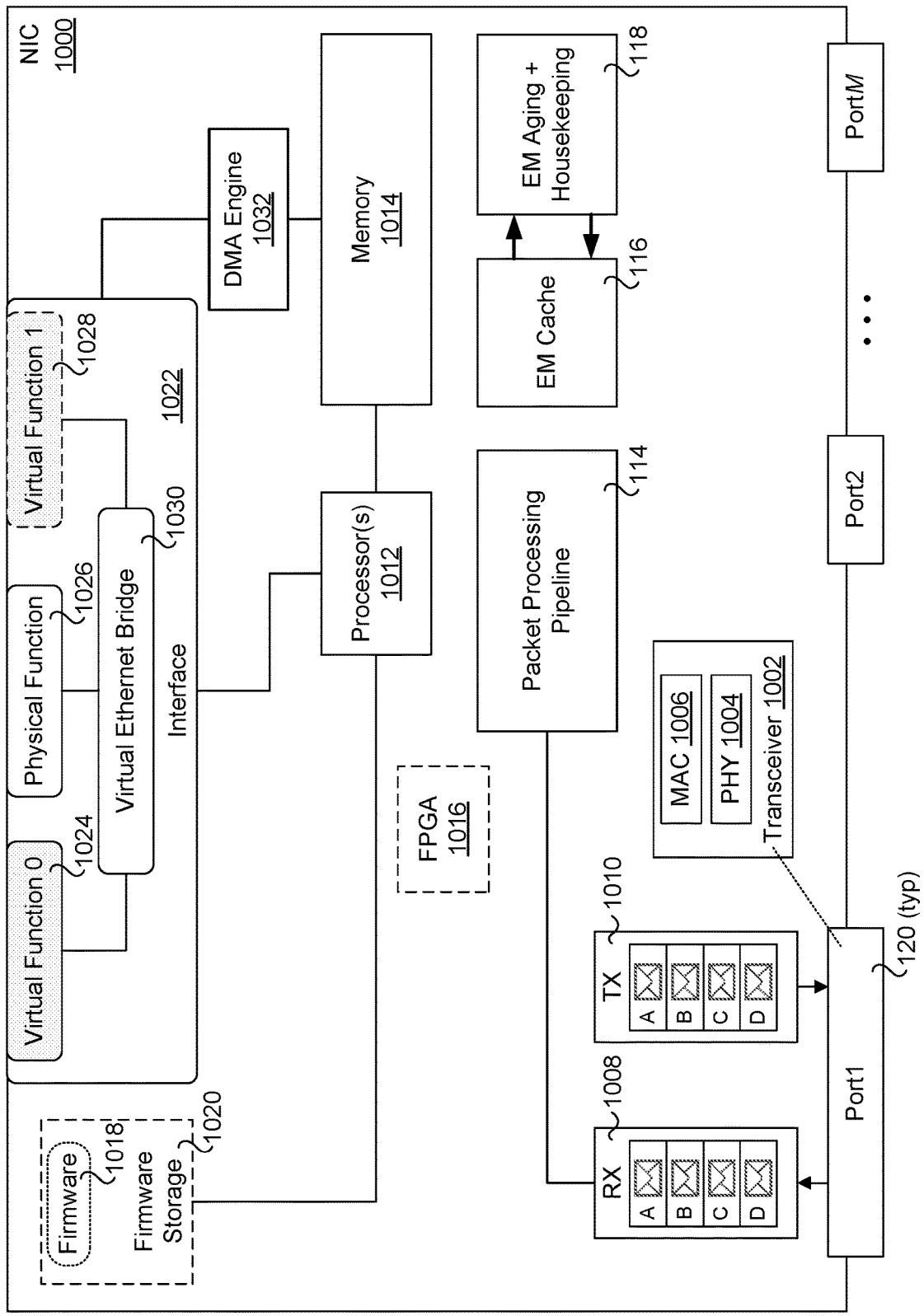
FIG. 10 is a schematic diagram of a NIC in which aspects of the embodiments herein are implemented, according to one embodiment.

FIG. 10 shows an embodiment of an example NIC 1000, which includes the packet processing pipeline 114, EM cache 116 and EM aging+housekeeping block 118 of FIGS. 1 and 1a, along with M port 120. Each port 120 includes a transceiver 1002 (i.e., transmitter (TX) and receiver (RX) including circuitry for implementing a PHY (Physical Layer) 1004 and a Media Access Channel (MAC) layer 1006. Each port 120 also includes a one or more receive (RX) buffers 1018 (only one is shown for simplicity) and a transmit (TX) queue 1010.

The functionality of packet processing pipeline 114 may be implemented via suitable embedded logic that may generally include fixed, pre-programmed and/or programmable circuitry, one or more processors, engines, processing elements, etc. on which firmware or software instructions are executed, or a combination thereof. NIC 1000 is depicted as including one or more processors 1012 coupled to memory 1014. In some embodiments, processors 1012 may include a single or multi-core processor running multiple concurrent threads. In some embodiments, the hash calculators discussed and illustrated herein may be implemented via threads executing on a processor. In other embodiments, the hash calculators may be implemented using fixed, preprogrammed, or programmable logic, such as an FPGA 1016. Processor(s) 1012 may execute firmware instructions 1018 that may be stored on-board NIC 1000, such as depicted by a firmware storage device 1020, and/or may be downloaded from a network.

Memory 1014 is representative of one or more memory devices and/or memory regions and/or otherwise may be partitioned for various purposes. In some embodiments, EM cache 116 and EM Aging+housekeeping block 118 store data in memory 1014. In other embodiments, EM Cache 116 may be implemented as a stand-alone component with its own logic and memory. A portion of memory 1014 may be implemented as Memory-Mapped Input-Output (MMIO) that is mapped to the virtual memory address space of the host (platform) enabling the host to directly read and write data in the MMIO address space.

NIC 1000 further includes an interface 1022. In the illustrated embodiment, interface 1022 includes a first virtual function 1024, a physical function 1026, and an optional second virtual function 1028. Generally, a NIC may include zero or more virtual functions and physical functions. In some embodiments, virtual and physical functions may be configured to support implementation in virtualized environment or para-virtualized environments. In the illustrated embodiment, interface 1022 comprises a Peripheral Component Internet Express (PCIe) endpoint supporting SR-IOV (Single Root, Input Output Virtualization), and includes a virtual Ethernet bridge 1030.

NIC 1000 is configured to support DMA (Direct Memory Access) data transfers with the host under which NIC 1000 can write directly to host memory and read directly from host memory using associated DMA transactions. In one embodiment, interface 1022 is a PCIe interface, and NIC 1000 includes a DMA engine 1032 that employs PCIe DMA transactions to write to and read from the host memory. DMA engine 1032 may be configured to support other IO protocols (in addition to or in place of PCIe).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet, part of the Internet, public cloud, private cloud, or hybrid cloud. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 11A:
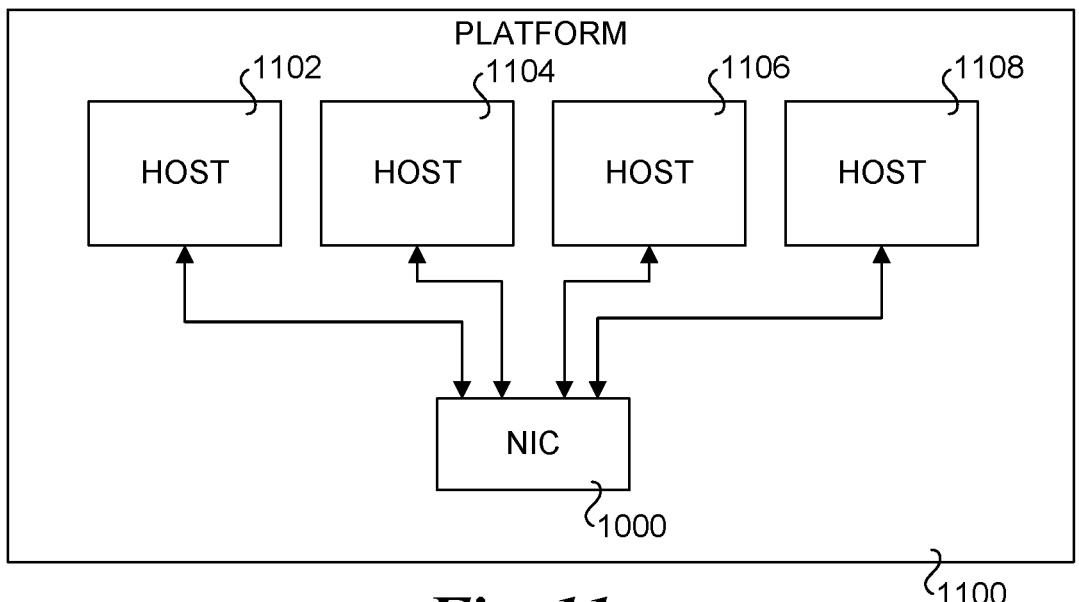
FIG. 11a is a schematic diagram illustrating a NIC coupled to a plurality of hosts in a platform.

In addition to a NIC being connected to a single host, the NIC may be connected to multiple hosts. For example, FIG. 11a shows a platform 1100 including a NIC 802 connected to each of hosts 1102, 1104, 1106, and 1106. In one embodiment, when connected to multiple hosts, NIC 1000 includes a separate set of EM caches and aging facilities for each host. In another embodiment, the EM cache match-action entries for multiple hosts are combined in the same EM cache.

Figure 11B:
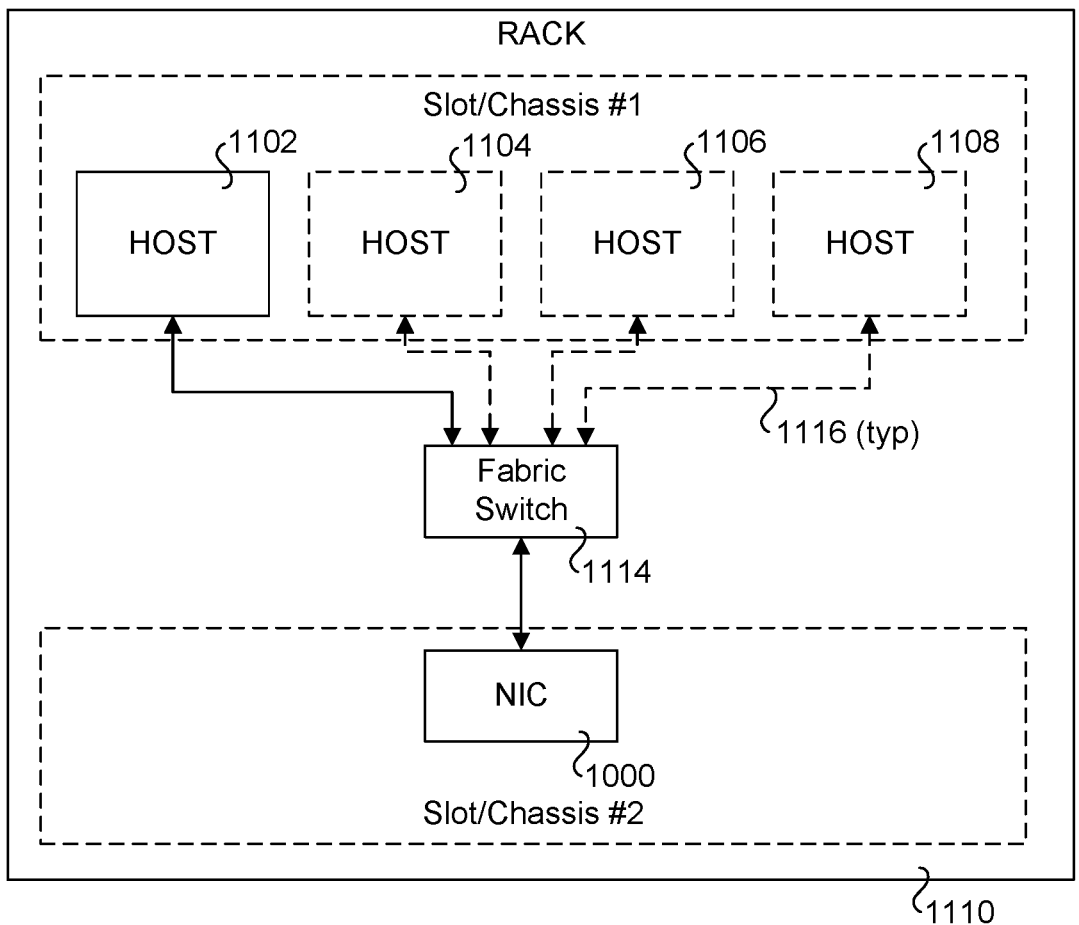
FIG. 11b is a schematic diagram illustrating a NIC in a first slot or chassis of a rack coupled in communication with one or more hosts in a second slot or chassis of the rack via a fabric.

As shown in FIG. 11b, a NIC can be installed in a rack in a slot, chassis, tray or sled that is separate from a slot, chassis, tray or sled in which one or more hosts connected to the NIC are installed. In this example, NIC 802 is installed in a slot or chassis #2 in a rack 1110 including multiple slots. One or more hosts 1102, 1104, 1106, and 1108 are installed in a slot or chassis #1. NIC 1000 is coupled in communication with one or more of hosts 1102, 1104, 1106, and 1108 via a fabric switch 1114 and fabric links 1116. In other embodiments, a NIC may be coupled in communication with a host in a separate slot or chassis via a point-to-point link. In still other embodiments, a NIC may be coupled in communication with a host in a separate rack (not shown).

Figure 12:
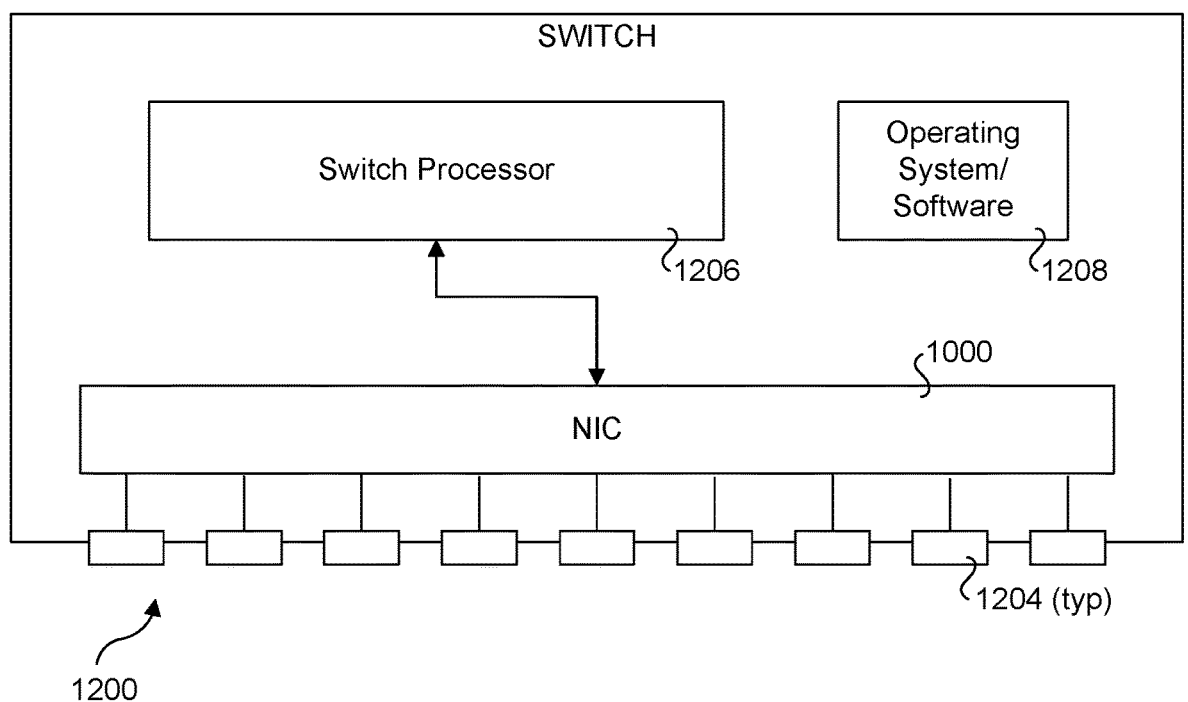
FIG. 12 is a schematic diagram illustrating implementation of a NIC in a switch.

The teachings and principles disclosed herein may also be implemented in a switch. For example, FIG. 12 shows a switch 1200 including a NIC 1000 connected to multiple switch ports 1204 and to a switch processor 1206. An operating system or other software 1208 is executed on switch processor 1206 to effect operations similar to those performed by the OS kernel protocol stack (or other operating system components) in the embodiments described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'n', M', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a platform including a processor, host memory, and a network interface, comprising:
   implementing a plurality of match-action tables in host memory, the plurality of match-action tables containing match-action entries comprising key-value pairs and configured to implement a multi-hash scheme employing a respective hash index for each match-action table;
   implementing an exact match (EM) cache on the network interface in which a portion of the match-action entries are cached in the EM cache;
   receiving a first packet at a port of the network interface;
   generating a key from data contained in the first packet;
   performing a lookup of the EM cache using the key; and
   when a match of a match-action entry is found in the EM cache, performing an action defined by the match-action entry.

2. The method of claim 1, further comprising:
   when the lookup of the EM cache results in a miss,
      using the key to perform a multi-hash search of the plurality of match-action tables in host memory to detect a match-action entry matching the key; and
   when there is a matching match-action entry that is found, performing the action in the match-action entry.

3. The method of claim 2, wherein a match-action entry is found, further comprising adding an entry to the EM cache corresponding to the match-action entry that is found.

4. The method of claim 2, wherein the multi-hash search of the plurality of match-action tables in host memory results in a miss, further comprising:
   determining a match-action table among the plurality of match-action tables in which a new match-action entry is to be added;
   adding the new match-action entry to that match-action table;
   adding a collision hint identifying one or more potential locations of the new match-action entry.

5. The method of claim 4, further comprising providing a hint to the network interface relating to the new match-action entry that has been added.

6. The method of claim 4, further comprising:
   returning information to the network interface indicating the multi-hash search of the plurality of match-action tables in host memory resulted in a miss; and
   performing an action via the network interface corresponding to a default action to be performed when a multi-hash search of the plurality of match-action tables in host memory results in a miss.

7. The method of claim 1, further comprising:
   implementing a first aging-out mechanism for the plurality of match-action tables in host memory including host memory aging information; and
   implementing a second aging-out mechanism for the EM cache on the network interface including cache aging information;
   wherein when a new match-action entry with an aging timer is added to one of the plurality of match-action tables, population of the new match-action entry into the EM cache causes an update to the cache aging information.

8. The method of claim 1, further comprising:
   removing a match-action entry from a match-action table in host memory;
   sending a hint to the network interface to remove a corresponding match-action entry from the EM cache; and
   when a corresponding match item entry is present is the EM cache, removing the match item entry from the EM cache.

9. A network interface, configured to be installed in a host platform having a processor and host memory in which a plurality of match-action tables containing match-action entries are stored, each match-action table having a hash index, comprising:
   a first port;
   a packet processing pipeline;
   an exact match (EM) cache in which a plurality of match-action entries cached from the plurality of match-action tables in host memory are stored;
   circuitry, including circuitry in the packet processing pipeline to,
      forward a packet received at the first port to the packet processing pipeline;
      generate, via the packet processing pipeline, a key derived from data in the packet; and
      perform a lookup of the EM cache using the key by,
      inputting the key to a plurality of hash calculators in parallel to generate a plurality of hashed key indexes;
      performing a first EM match search using a first hashed key index; and
      when a match of a match-action entry is found in the EM cache using the first hashed key index, performing an action defined by the match-action entry.

10. The network interface of claim 9, wherein the lookup of the EM cache further comprises:
    detecting the first EM match search using the first hashed key results in a miss, and in response thereto,
    inspecting a collision hint table to determine one or more additional hashed key indexes to search with; and
    searching the EM cache using the one or more additional hashed key indexes.

11. The network interface of claim 10, further comprising a content addressable memory (CAM) and circuitry to implement the collision hint table in the CAM.

12. The network interface of claim 10, further comprising circuitry to:
    determine there are no matching entries in the EM cache for the key; and
    forward the key to the host memory.

13. The network interface of claim 12, further comprising circuitry to:
  receive a new match-action entry to be cached in the EM cache; and
  insert the new match-action entry into the EM cache.

14. The network interface of claim 9, further comprising:
  an EM aging data structure; and
  circuitry to age-out match-action entries in the EM cache using the EM aging data structure.

15. A system, comprising:
  a processor having a plurality of cores;
  memory, coupled to the processor;
  software instructions configured to be executed on one or more of the plurality of cores to cause the system to,
    implement a plurality of match-action tables in the memory, the match-actions tables configured to store a plurality of match-action entries at respective indexes in each match action table; and
    perform a lookup into the plurality of match-action tables using a multi-hash scheme;
  a network interface including:
    a first port;
    a packet processing pipeline; and
    an exact match (EM) cache in which a plurality of match-action entries cached from the plurality of match-action tables in memory are stored,
    wherein the system is configured to atomically add and remove match-action entries in the EM cache and the plurality of match-action tables.

16. The system of claim 15, wherein the network interface further comprises circuitry to:
  receive a packet at the first port;
  generate a key derived from data in the packet; and
  perform a lookup of the EM cache using the key by,
    inputting the key to a plurality of hash calculators in parallel to generate a plurality of hashed key indexes;
    performing a first EM match search using a first hashed key index; and
    when a match of a match-action entry is found in the EM cache using the first hashed key index, performing an action defined by the match-action entry.

17. The system of claim 16, wherein the network interface further comprises circuitry to:
  detect the first EM match search using the first hashed key results in a miss, and in response thereto,
  inspect a collision hint table to determine one or more additional hashed key indexes to search with; and
  search the EM cache using the one or more additional hashed key indexes.

18. The system of claim 17, wherein the network interface further comprises circuitry to:
  determine there are no matching match-action entries in the EM cache for the key; and
  forward the key to the memory,
  and wherein execution of the software instructions on one or more processor cores enables the system to perform a lookup of the plurality of match-action tables with the key to find a matching match-action entry.

19. The system of claim 18, wherein in response to finding a match-action entry in a match-action table, the software instructions are configured, upon execution by a processor core, to forward information to the network interface associated with the matching match-action entry, and wherein the circuitry in the network interface is further configured to insert a new match-action entry in the EM cache corresponding to the matching match-action entry.

20. The system of claim 18, wherein the software instructions are configured, upon execution by one or more processor cores, to:
  detect there are no match-action entries in the plurality of match-action tables that match the key; and, in response thereto
  employ the key to generate a new match-action entry using a multi-hash scheme;
  insert the new match-action entry into one of the plurality of match-action tables; and
  insert a collision hint corresponding to the new match-action entry in a collision hint table.

* * * * *